(12) United States Patent
Minovitch

(10) Patent No.: US 9,334,854 B2
(45) Date of Patent: May 10, 2016

(54) CLOSED-CYCLE CRYOGENIC ENGINE AND OPERATING METHOD FOR PROPELLING VEHICLES AND GENERATING ELECTRICITY

(71) Applicant: Michael Minovitch, Los Angeles, CA (US)

(72) Inventor: Michael Minovitch, Los Angeles, CA (US)

( * ) Notice: Subject to any disclaimer, the term of this patent is extended or adjusted under 35 U.S.C. 154(b) by 0 days.

(21) Appl. No.: 14/120,711

(22) Filed: Jun. 20, 2014

(65) Prior Publication Data

US 2015/0369221 A1   Dec. 24, 2015

(51) Int. Cl.

| | |
|---|---|
| *F24J 3/06* | (2006.01) |
| *F01K 25/10* | (2006.01) |
| *F03G 7/00* | (2006.01) |
| *F03G 7/06* | (2006.01) |
| *F03G 6/00* | (2006.01) |
| *F03G 7/04* | (2006.01) |
| *F02C 1/10* | (2006.01) |
| *F02C 1/05* | (2006.01) |

(Continued)

(52) U.S. Cl.
CPC . *F03G 7/06* (2013.01); *F01K 25/10* (2013.01); *F02C 1/05* (2013.01); *F02C 1/10* (2013.01); *F02C 6/16* (2013.01); *F03G 6/003* (2013.01); *F03G 7/00* (2013.01); *F03G 7/04* (2013.01); *F24J 3/06* (2013.01); *F01K 15/02* (2013.01); *F17C 1/12* (2013.01)

(58) Field of Classification Search
CPC ............. F03G 7/00; F03G 7/04; F01K 25/10; F01K 25/103; F01K 25/106; F02C 1/002; F02C 1/10; F02C 1/105; F02C 1/04; F02C 1/05; F02C 6/14; F02C 6/16; F02C 1/02; F16J 12/00; F24J 3/06; F17C 1/12; F17C 5/06
USPC ............. 60/650, 682, 684, 659, 641.1, 641.6; 138/31
See application file for complete search history.

(56) References Cited

U.S. PATENT DOCUMENTS

| | | | | |
|---|---|---|---|---|
| 2,829,501 | A | * | 4/1958 | Walls .............................. 60/659 |
| 3,451,342 | A | | 6/1969 | Schwartzman |

(Continued)

OTHER PUBLICATIONS

Joachim E. Lay, Thermodynamics, Charles E. Merrill Publishing Co., Columbus, Ohio.

(Continued)

*Primary Examiner* — Thomas Denion
*Assistant Examiner* — Xiaoting Hu
(74) *Attorney, Agent, or Firm* — Robert J. Lauson; Lauson & Tarver LLP

(57) ABSTRACT

A closed-cycle cryogenic engine includes a high specific heat working fluid remaining in a gaseous phase. The high temperature heat reservoir is the natural environment and the low temperature heat reservoir is created artificially by evaporating water. Isothermally compressing the working fluid at low temperature by absorbing compression heat by evaporating water extracts heat energy from the environment, converting it into net output. A plurality of serially connected isentropic expanders is interposed with a like plurality of re-heating stages. The temperature difference between the high and low temperature heat reservoirs is a few degrees, allowing expansion operation with low expansion ratios, enabling a large number of expanding and reheating steps Each engine cycle extracts natural heat energy from the environment, converting a large fraction into high density net output work. Very little water, the engine's only fuel, is consumed since evaporating water's latent heat is high.

9 Claims, 4 Drawing Sheets

(51) Int. Cl.
  *F02C 6/16*   (2006.01)
  *F01K 15/02*  (2006.01)
  *F17C 1/12*   (2006.01)

(56) References Cited

U.S. PATENT DOCUMENTS

| | | | | |
|---|---|---|---|---|
| 3,636,719 | A * | 1/1972 | Sato et al. | 62/6 |
| 3,708,979 | A * | 1/1973 | Bush et al. | 60/522 |
| 3,740,509 | A * | 6/1973 | Clerc et al. | 218/78 |
| 3,802,211 | A * | 4/1974 | Bamberg et al. | 62/6 |
| 4,170,878 | A * | 10/1979 | Jahnig | 60/641.7 |
| 4,311,010 | A * | 1/1982 | Wurmfeld | 60/641.8 |
| 4,624,109 | A * | 11/1986 | Minovitch | 60/648 |
| 4,745,745 | A * | 5/1988 | Hagin | 60/414 |
| 5,107,682 | A * | 4/1992 | Cosby | 60/650 |
| 2009/0021012 | A1* | 1/2009 | Stull et al. | 290/44 |
| 2011/0049909 | A1* | 3/2011 | Domes | 290/1 R |
| 2011/0277476 | A1* | 11/2011 | Minovitch | 60/645 |

OTHER PUBLICATIONS

Carl Bachhuber, Energy from the evaporation of water, American Journal of Physics, vol. 51, No. 3, Mar. 1983, pp. 259-264.

Richard Murrow, Rand Corporation Technical Report No. P-3367 Aug. 1966, A Simple Heat Engine of Possible Utility in Primitive Environments.

Richard Murrow, The Research Frontier—Where is Science Taking Us, Saturday Review, vol. 50, Jun. 3, 1967, pp. 51-55.

M.V. Sussman, Liquid Nitrogen as an Energy Source for an Automotive Vehicle, Advances in Cryogenic Engineering, vol. 2, 1980, pp. 831-837.

NIST Report (National Institute of Standards and Technology).

D.C. Lindsay, Drying and Processing of Materials by Means of Conditioned Air, Carrier Engineering Corp., 1929, pp. 26-42.

Psychrometric Chart.

National Institute of Standards & Technology, (NIST) Publication entitled NIST Reference Fluid Thermodynamic & Transport Properties, REFPROP Version 8.0, 2007.

R. Barron, Cryogenic Systems, McGraw-Hill Book Co., New York, 1966.

Francis Sears, Mechanics, Heat & Sound, Addison-Wesley Press, Inc., Cambridge MA, 1952.

B. Meinel & M.P. Meinel, Ch. 3 Solar Availability, pp. 87-114, in Applied Solar Energy—An Introduction, Addison-Wesley Publishing Co., Reading, MA, 1978.

J.P. Holman, Heat Transfer, McGraw-Hill Book Co., New York, 1983.

* cited by examiner

PSYCHROMETRIC CHART (PRIOR ART)

CLOSED-CYCLE CRYOGENIC ENGINE AND OPERATING METHOD FOR PROPELLING VEHICLES AND GENERATING ELECTRICITY

BACKGROUND

For hundreds of years engineers and scientists have recognized that the ambient thermal energy of the natural environment that is heated by the sun contains essentially unlimited amounts of free thermal energy. Unfortunately, all prior attempts to harness this natural heat energy and convert it into mechanical work with high power densities by a closed cycle heat engine utilizing the natural environment as its high temperature heat reservoir have failed. As a result of all of these unsuccessful attempts, thermodynamicists have concluded that such engines are impossible. However, it is important to point out that this negative conclusion is not based on any fundamental physical law of nature but rather on the unsuccessful attempts to construct such engines. Although the "second law of thermodynamics" is usually cited as the basic reason why such engines are believed to be impossible, the second law itself is based on unprovable "postulates" laid down by Kelvin, Clausius and Planck over a century ago when the principle of conservation of mass and energy was accepted without question. (See *Thermodynamics*, Charles E. Merrill Publishing Co., Columbus, Ohio, pages 147-153 by Joachim E. Lay.) The Kelvin-Planck statement of the second law of thermodynamics is: "It is impossible to construct an engine which, operating in a cycle, will produce no other effect than the extraction of heat from a single heat reservoir and the performance of an equivalent amount of work."

By designing a cyclic heat engine that falls outside the operating conditions of the second law of thermodynamics (the premise) it is possible to harness the natural thermal energy of the environment at ambient temperature and convert a portion of it into mechanical work. One such heat engine is a simple toy called the "drinking bird" that can be found in almost any novelty shop. Although this engine is a closed cycle heat engine and uses the ambient environment as its high temperature heat reservoir, it operates by generating an artificial low temperature heat reservoir by evaporating water. Hence, it does not operate according to the prescribed conditions of the Kelvin-Planck statement of the second law of thermodynamics (the premise) and therefore cannot violate this law.

The basic thermodynamic operating principles of the drinking bird engine were analyzed by Carl Bachhuber in his paper, "Energy From the Evaporation Of Water, *American Journal of Physics*, Vol. 51, No. 3, March 1983, pp. 259-264. In particular, Bachhuber has shown that ordinary water can be used to extract an unlimited amount of natural thermal energy from the surrounding environment and convert a portion of it into mechanical work. Moreover, the specific energy of water that can be converted into useful mechanical work by this engine is approximately twice the specific energy available in automotive storage batteries. In a technical report issued by the Rand Corporation in August 1966, entitled *A Simple Heat Engine of Possible Utility in Primitive Environments*, Rand Corporation Publication No. P-3367, Richard Murrow proposed constructing larger versions of this engine for pumping water from the Nile river. A scaled up model of the basic drinking bird engine was constructed to a height of seven feet and found to be able to extract a considerable amount of natural heat energy from the ambient environment and convert a portion of it into mechanical work. In particular, the engine would be capable of extracting an unlimited amount of natural heat energy and convert it into an unlimited amount of mechanical work. (See, "The Research Frontier-Where is Science Taking Us," *Saturday Review*, Vol. 50, Jun. 3, 1967, pp. 51-55, by Richard Murrow.) Obviously, engines such as these which operate by converting the natural heat energy of the environment at ambient temperature into an unlimited amount of mechanical work are not "perpetual motion machines." In principle, larger engines of this type could be used to propel ocean going vessels indefinitely using ordinary sea water for generating an unlimited amount of mechanical work. Although this possibility is generally believed to be thermodynamically impossible, it is clearly not impossible. The existence of these engines proves that it is indeed possible, to extract natural heat energy from the environment at ambient temperature and convert a portion of it into mechanical work by creating an artificial low temperature heat reservoir (heat sink) below ambient. Unfortunately, all prior attempts have been impractical because they have very low power densities.

What has to be pointed out and emphasized regarding the possibility of violating the second law of thermodynamics is the creation of an artificial low temperature heat sink If any cyclic heat engine produces such a low temperature heat sink while it operates, it is, "strictly speaking," operating outside the premise of the second law and therefore, cannot logically be subject to this law.

There is one type of heat engine that operates, as in the drinking bird engine, by converting natural heat energy in the environment at ambient temperature into mechanical work. They are known as "cryogenic engines." Moreover, unlike the drinking bird engine, these engines operate at very high power densities. In this engine the working fluid is a liquified gas at cryogenic temperature, such as liquefied nitrogen at 77° K (−321° F.) which is the usual working fluid in cryogenic engines. They operate by compressing the liquified working fluid at cryogenic temperature to very high pressure (e.g., 500 Bar or 7,252 lbs/in$^2$) by a hydraulic compressor. Since liquified gas has very low specific volume, relatively little mechanical work is consumed by compressing it. After it is compressed, it is fed into a heat exchanger maintained in thermal contact with the natural environment at ambient temperature. The high pressure liquefied working fluid entering the heat exchanger creates a significant temperature gradient across the thermal surfaces and a large amount of natural heat energy is extracted from the environment at ambient temperature and rapidly absorbed by the circulating compressed working fluid at cryogenic temperature. The liquefied working fluid is isobarically heated above its critical temperature (126.3° K in the case of nitrogen working fluid) and completely vaporized into a high pressure gas. The vaporization process results in a several hundred fold increase in its specific volume. In principle, the process is identical to that of feeding compressed water into the high temperature boiler of a conventional closed-cycle steam engine used for generating bulk electric power in a power plant. The compressed water absorbs the heat energy in the boiler and vaporizes into high pressure steam resulting in an increase of its specific volume. In the case of the cryogenic engine, the "boiler" is the natural heat energy in the natural environment at ambient temperature.

The cryogenic working fluid emerges from the heat exchanger as a very high pressure, superheated gas at about ambient temperature and fed into an expander where it is expanded down to a certain sub-ambient temperature above its critical temperature. Since the expanded working fluid still has a high pressure, it is fed into another heat exchanger in thermal contact with the natural environment where it absorbs additional natural heat energy and fed into another serially connected expander and expanded down to a sub-ambient temperature thereby converting the additional heat energy absorbed from the natural environment into additional mechanical work. Since the expanded sub-ambient gas still has a relatively high pressure, it is fed into another heat exchanger and expander to convert additional natural heat energy into additional mechanical work. This process of feeding the expanded gas back into a heat exchanger maintained in thermal contact with the natural environment at ambient temperature and expanded in another expander is continued in a series of serially connected reheating and expansion stages until the pressure of the expanded gas discharged from the last expander in the series reaches atmospheric pressure and exhausted into the open atmosphere. Since there is no natural heat sink to re-liquify the gas leaving the last expander, it is discharged into the open atmosphere as exhaust gas. The engine can only continue to operate by continuously feeding in new liquified gas at cryogenic temperature into the compressor. Thus, all prior art cryogenic engines operate by compressing a liquified gas to very high pressure and feeding it into a serially connected plurality of heat exchangers and expanders that extracts natural heat energy from the environment at ambient temperature and converts a portion of it into mechanical work in an open cycle. Since they operate by consuming liquified working fluid to generate mechanical power, they are similar, in principle, to internal combustion engines used for propelling conventional automobiles because these engines consume gasoline to keep operating. (The operating details of prior art cryogenic engines can be found in U.S. Pat. No. 3,451,342 filed Oct. 24, 1965 by E. H. Schwartzman entitled "Cryogenic Engine Systems and Method.") However, cryogenic engines have very high power densities and do not pollute the environment by burning any combustible fuel. Therefore, since high-pressure cryogenic expanders are very small, have power densities far higher than any internal combustion engine, generate very little sound, and produce no polluting exhaust products, cryogenic engines have been proposed for propelling road vehicles. (See the article, "Liquid Nitrogen as an Energy Source for an Automotive Vehicle," *Advances in Cryogenic Engineering*, Vol. 25, 1980, pp. 831-837 by M. V. Sussman.) Unfortunately, liquified gas is much more expensive than gasoline and hence cryogenic engines are more expensive to operate than internal combustion engines. Although cryogenic engines operate by converting natural heat energy in the environment at ambient temperature into mechanical work at very high power densities, they are not cyclic heat engines. When the supply of liquefied working fluid at cryogenic temperature is consumed, the engine stops operating and must be re-filled with more liquefied gas working fluid. Since these engines operate by well-known thermodynamic processes according to the principles of thermodynamics, the expanded working fluid discharged from the last expander cannot be recondensed into a liquid at cryogenic temperature by conventional processes since there is no natural heat sink available at cryogenic temperatures to absorb the heat of vaporization that is required for achieving condensation. Since the cost of liquefied gas at cryogenic temperatures is very high, these prior art cryogenic engines are much more expensive to operate then internal combustion engines.

However, by designing a cryogenic engine with a working fluid such hydrogen that has a very high specific heat and very low critical temperature, recompressing the expanded gas isothermally at a sub-ambient temperature using an amount of mechanical work less than the amount of mechanical work generated from the expanders, and creating an artificial low-temperature heat sink to absorb the heat of compression of the isothermal compressor below natural ambient temperature by evaporating water, it will be possible to design a cryogenic engine such that the compressed working fluid always remains in the gaseous phase thereby enabling the engine to operate in a closed cycle at high power densities. But unlike all prior art cryogenic engines, this closed cycle cryogenic engine can convert an unlimited amount of natural heat energy at ambient temperature into an unlimited amount of mechanical work at high power densities without consuming any of its working fluid.

Since internal combustion engines used for propelling road vehicles generate huge amounts of toxic exhaust products harmful to all life and pollutes the environment, the closed cycle cryogenic engine disclosed herein provides a low cost alternative power source for propelling vehicles and generating electricity without generating any pollution. By increasing the size of the engine, they may also be used for generating bulk electricity in large power plants that presently operate by burning huge amounts of combustible fuel that generates toxic exhaust products or by operating nuclear reactors. Nuclear reactors generate extremely harmful radioactive waste products that can last for thousands of years. They are also subject to catastrophic accidents that can render huge areas of land uninhabitable. There is also the increasingly serious problem of "thermal pollution" that results from the necessity of having to absorb all of the rejected latent heat of condensation into the environment.

The cryogenic engine disclosed in the present invention is fundamentally and uniquely different from all prior art cryogenic engines in that the working fluid remains in the gaseous phase and operates as a closed cycle cryogenic engine. After the compressed low-temperature gaseous working fluid is heated by passing through a heat exchanger maintained in thermal contact with flowing atmospheric air at ambient temperature (which represents the engine's high temperature heat reservoir), it is isentropically expanded down to the sub-ambient temperature of evaporating water thereby converting a portion of the absorbed natural heat energy into mechanical work at very high power densities. By recompressing the gas at sub-ambient temperature isothermally by absorbing the heat of compression by evaporating water, the recompressed gas can be fed back into the heat exchanger to repeat the process in a closed cycle. Since the system can be designed such that the amount of mechanical work generated by the isentropic expander is greater that the amount of mechanical work consumed by the isothermal compressor, the net amount of mechanical work generated in each cycle will be positive. Barring mechanical breakdown, the engine will be able to extract unlimited amounts of natural heat energy from the environment at ambient temperature and convert it into unlimited amounts of mechanical work at high power densities for as long as the water supply lasts. Unlike prior art cryogenic engines, the working fluid is never consumed. The only fluid that is consumed is water that is available everywhere in unlimited amounts at no cost. Thus, the closed cycle cryogenic engine disclosed in the present invention represents a low-cost replacement engine for most internal combustion engines used for propelling vehicles and for generating electricity because it does not require burning any combustible fuel that is expensive and pollutes the environment, and because it operates at very high power densities.

SUMMARY OF THE INVENTION

In the preferred embodiment of the invention, a closed cycle, cryogenic engine and operating 78 method is provided for propelling road vehicles at high power densities without consuming any working fluid. The engine comprises a working fluid having a high specific heat and a low critical temperature that remains in a gaseous phase throughout the cycle. The high temperature heat reservoir is represented by the natural environment at ambient temperature and the low temperature heat reservoir is created artificially by evaporating water. By isothermally compressing the working fluid at low temperature to very high pressure exceeding 500 Bar by absorbing the heat of compression by evaporating water, it is possible to extract a large amount of natural heat energy from the environment at ambient temperature and convert a large fraction of it into net output work. This is achieved by designing the work generating expansion system as comprising a large plurality of serially connected isentropic expanders interposed with a like plurality of isobaric re-heating stages. Since the temperature difference between the high and low temperature heat reservoirs is just a few degrees, it is possible to design the expanders to operate with very low expansion ratios thereby enabling the number of expanders and reheating steps to be very large. This enables each cycle of the engine to extract a large amount of natural heat energy from the environment and convert a large fraction of it into a large amount of net output work at very high power densities. Since the latent heat of evaporating water is very high, very little water is consumed in each cycle which represents the engine's only fuel that is consumed.

The engine comprises: (1) a working fluid that remains in a compressed gaseous state; (2) a heat exchanger heated by flowing atmospheric air at ambient temperature in thermal contact with the heat exchanger such that the mass flow rate of atmospheric air flowing over the heating surfaces of the heat exchanger is many times greater than the mass flow rate of the working fluid circulating inside; (3) a plurality of serially connected isentropic expanders having very low and equal pressure ratios operating with an inlet temperature equal to the ambient temperature of atmospheric air, and a low outlet temperature equal to the temperature of evaporating water that isentropically expands compressed working fluid heated in the heat exchanger down to the temperature of evaporating water and repeating said heating and expansion steps through many down-stream serially-connected expanders many times until the discharge pressure of the last expander in the series reaches a certain pressure thereby converting a large portion of the natural heat energy absorbed in the heat exchanger into mechanical work; (4) a thermally insulated isothermal recompressor operating at the sub-ambient temperature of evaporating water that absorbs the compressor's heat of compression such that the compressor consumes an amount of mechanical work less than the amount of mechanical work generated by all of the expanders; (5) a thermally insulated load-leveling high pressure, variable-volume, cylinder for storing high pressure gas at sub-ambient temperature that can be withdrawn and fed into the heat exchanger and expanded to generate mechanical work at varying mass flow rates for controlling the power output of the engine, and (6) a thermally insulated load-leveling, variable-volume low pressure gas storage cylinder at sub-ambient temperature for accumulating the expanded gas that is discharged from the last expander that is withdrawn, fed into the recompressor, isothermally recompressed, and fed back into the high-pressure storage cylinder at the same sub-ambient temperature in a closed cycle.

The thermally insulated high and low pressure gas storage cylinders are designed with variable volumes controlled by movable pistons that move in and out along their longitudinal central axis. Compressed sub-ambient gas is withdrawn from the high-pressure storage cylinder at some desired mass flow rate $\dot{m}_E$ and fed into the heat exchanger where it is heated. The heated compressed gas discharged from the heat exchanger is fed into the serially connected isentropic expanders where a large portion of the absorbed natural heat energy of the environment is converted into mechanical work at very high power densities that is inherent in high pressure cryogenic expanders. The expanded low pressure low temperature gas is fed into the low pressure storage cylinder where it is accumulated at the low pressure and sub-ambient temperature. This system of gas storage cylinders that are connected to the isothermal recompressor is designed to operate simultaneously or at different times whether the vehicle is moving or parked and not being used for transportation. This design feature of the invention enables the engine to use all the power generated by all of the cryogenic expanders to provide enormous propulsive power for propelling the vehicle over relatively long distances without evaporating any water. When the vehicle is parked and not being used for transportation, the engine is automatically turned on by an engine control computer to re-fill the high-pressure gas storage cylinder to maximum capacity by operating the recompressor. When the high-pressure cylinder is full, the engine control computer automatically turns the engine off.

The closed cycle operating principle of the cryogenic engine is achieved by isothermally compressing the gas (assumed to be hydrogen) to a very high initial pressure (assumed to be 600 Bar in the preferred embodiment) by absorbing the heat of compression by evaporating water at a sub-ambient temperature $T_L$. Feeding it into the heat exchanger where it is isobarically heated to high temperature $T_H$ equal to the ambient temperature of the environment by extracting natural heat energy from the flowing atmospheric air at ambient temperature in the heat exchanger. Withdrawing the heated compressed gas from the heat exchanger and feeding it into a very large plurality of serially connected cryogenic expanders, interposed with a like plurality of reheating steps where it is isentropically expanded with a very low pressure ratio such that the expanded gas leaves each expander at the low temperature $T_L$ of the evaporating water, reheated to extract more natural heat from the environment and fed into the next down-stream expander where the working fluid is reheated in a continuing series of expansion and reheating steps thereby extracting a large amount of natural heat energy from the environment and converting a large fraction of it into mechanical work at high power densities. The gas discharged from the last expander in the series is fed into a thermally insulated load-leveling, low-pressure, variable-volume, storage cylinder with a movable piston that controls its volume where it is accumulated. This low-temperature, low-pressure gas at temperature $T_L$, and pressure $P_L$ is withdrawn from the low-pressure storage cylinder at a certain mass flow rate $\dot{m}_C$ and fed into the thermally insulated isothermal recompressor where it is recompressed back to the high initial pressure of 600 Bar at the sub-ambient temperature $T_L$. The heat of compression is absorbed by evaporating water maintained in thermal contact with the external walls of the recompressor. Since the latent heat of evaporating water is very high (about 2,500 J/gm) relatively little evaporating water will absorb a large amount of the compressor's heat of compression at $T_L$. The system is designed such that the mass flow rate of gas $\dot{m}_E$ leaving the high-pressure storage cylinder can be different from the mass flow rate $\dot{m}_C$ of the gas that is recompressed and fed back into the high-pressure storage cylinder. By compressing the working fluid to very high pressures and using a working fluid that has a very high specific heat and low critical temperature such as hydrogen, the engine can achieve very high power densities in a closed cycle without consuming any of its working fluid. The only fluid that is consumed is small amounts of water.

BRIEF DESCRIPTION OF THE DRAWINGS

These and other advantages and features of the invention will be apparent from the disclosure, which includes the specification with the foregoing and ongoing description, the claims and the accompanying drawings wherein:

DESCRIPTION OF THE PREFERRED EMBODIMENT

Figure 1:
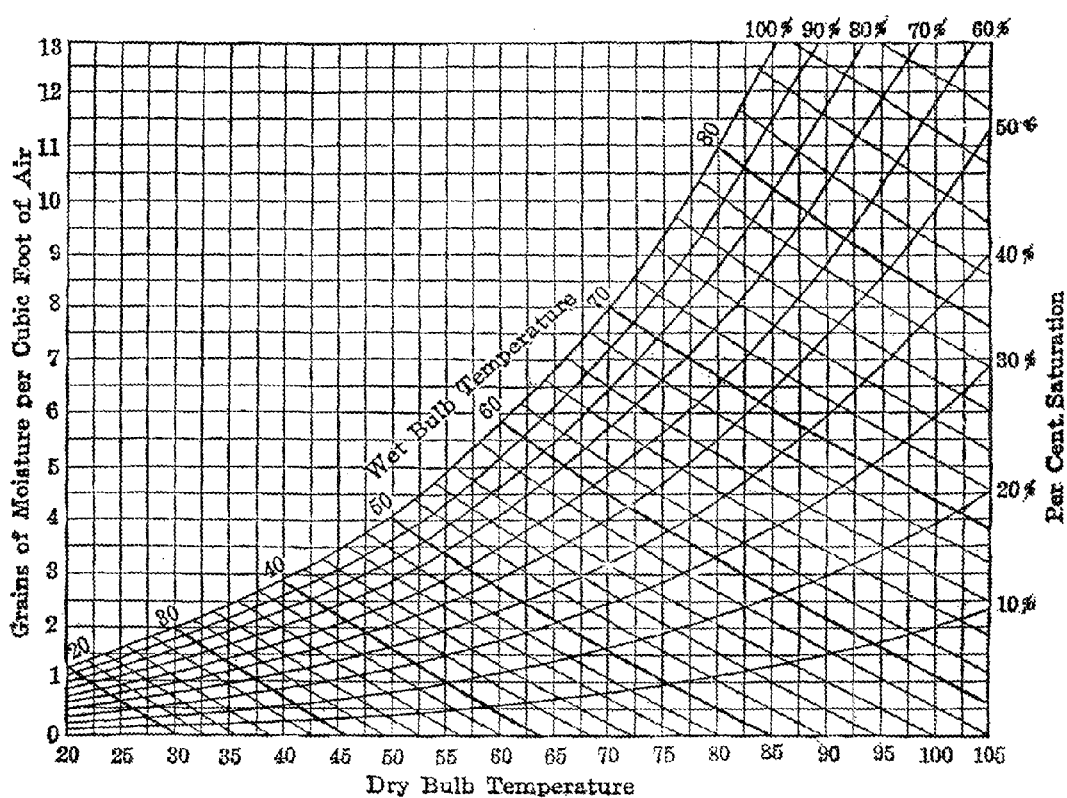
FIG. 1 is a Psychrometric Chart for evaporating water in the open atmosphere giving the wet-bulb temperature for various dry-bulb temperatures corresponding to various values of the relative humidity (also known as percent saturation) illustrating how a sub-ambient low temperature heat reservoir can be created by evaporating water (Prior Art)

In the preferred embodiment of the invention, a closed cycle, non-condensing, cryogenic engine is presented using compressed hydrogen gas as its constant-phase working fluid, and the heat energy in the natural environment as its high-temperature heat reservoir. The natural heat energy of the environment is extracted by isothermally compressing the gaseous working fluid at a sub-ambient temperature to 600 Bar by absorbing the heat of compression by evaporating water at sub-ambient temperature and feeding the compressed sub-ambient working fluid into a heat exchanger maintained in thermal contact with large amounts of flowing atmospheric air at natural ambient temperature where it is isobarically heated to ambient temperature $T_H$. The heated compressed gas is withdrawn from the heat exchanger and fed into the first isentropic cryogenic expander of a large plurality of serially connected cryogenic expanders having very low pressure ratios. The first expander expands the very high pressure gas down to the temperature of evaporating water $T_L$ that represents the engine's low temperature heat reservoir. Since the temperature $T_L$ of the expanded gas is just a few degrees below ambient temperature $T_H$ of the natural environment which represents the engine's unlimited high temperature heat reservoir, the pressure of the gas leaving the first expander is still very high. This low temperature high pressure gas discharged from the first expander is fed back into the heat exchanger where it extracts more natural heat energy that is converted into more mechanical work. In the preferred embodiment, this process of expanding and reheating steps of extracting natural heat energy from the environment and converting a large fraction of it into mechanical work is repeated a total of 32 times in 32 serially connected cryogenic expanders thereby extracting and converting a large amount of natural heat energy from the environment and converting a large fraction of it into mechanical work at very high power densities using a very small amount of working fluid.

After leaving the last expander at a sub-ambient temperature $T_L$ equal to the temperature of evaporating water, the expanded gas is fed into a large, low-pressure thermally insulated, variable-volume, gas storage cylinder where it is accumulated. This low pressure, low temperature gas is withdrawn from this low-pressure storage cylinder, fed into an isothermal recompressor at the sub-ambient temperature $T_L$, recompressed back to the initial high pressure and initial sub-ambient temperature $T_L$ and fed into a thermally insulated, variable-volume, high-pressure gas storage cylinder. This high-pressure, low-temperature gas is withdrawn from the high-pressure storage cylinder and fed back into the heat exchanger and 32 serially connected cryogenic expanders to extract more natural heat energy from the environment and convert a large portion of it into mechanical work in a closed cycle. By utilizing the fact that evaporating water has an unusually high latent heat of evaporation, it is possible to absorb a large amount of heat generated by the isothermal recompressor by evaporating a relatively small amount of water thereby enabling the engine to generate large amounts of mechanical work at high power densities by evaporating relatively small amounts of water which represents the engine's only "fuel" that the engine consumes. Thus, in the cryogenic engine disclosed herein, the working fluid is never consumed which is presently believed to be impossible in the design of prior art cryogenic engines. Since the total amount of mechanical work generated by all the cryogenic expanders is greater than the amount of mechanical work consumed by the isothermal recompressor, the preferred embodiment of the engine will be able to generate a net amount of mechanical output work of about 95 J/(gm-$H_2$) at very high power densities. To rigorously prove this fact, the disclosure will include a detailed thermodynamic performance analysis based on very accurate thermodynamic property data for the compressed hydrogen gas working fluid prepared and published by the United States National Institute of Standards and Technology (NIST).

By designing the engine with a large water tank having a capacity of about 600 liters (158 gal) an automobile propelled by this closed cycle cryogenic engine (that consumes only water instead of expensive gasoline), could be driven about 50 miles at a speed of 60 mph before the water tank needs to be refilled. Moreover, by designing the engine with large variable-volume high and low pressure gas storage cylinders, it will be possible to design the engine such that the vehicle can be propelled for relatively long distances at a speed of 60 mph without operating the isothermal recompressor thereby enabling all of the mechanical work generated by the expanders to be used for propelling the vehicle. When the vehicle is parked and not being used for transportation, the engine is automatically started by an engine control computer that uses all of the generated power to recompress the expanded gas that has been accumulated in the low-pressure cylinder, back to the initial high pressure at sub-ambient temperature and fed back into the high-pressure cylinder such that the amount of high-pressure gas in the high-pressure cylinder is always maintained at maximum, or near-maximum capacity. This operating feature will enable the engine to propel a vehicle with very high propulsive power by not running the recompressor, and running the recompressor when the vehicle is parked and not being used for transportation to automatically re-fill the high-pressure storage cylinder. The engine can also be designed to generate unlimited amounts of electricity for private homes and, by increasing its size, for generating large amounts of bulk electric power in power plants for industry and commerce without consuming any expensive combustible fuel and without generating any pollution.

The invention is made possible by taking advantage of the fact that the latent heat of evaporating water is very high (about 2,500 J/gm) which represents a thermal power of 2.5 KW/gm-sec) while simultaneously generating a significant drop in the temperature of anything in thermal contact with evaporating water. Thus, one of the most important operating components of the present invention that enables the cryogenic engine disclosed herein to operate cyclically without consuming any of its working fluid is the creation of an artificial low temperature heat reservoir by evaporating small amounts water which represents the engine's only "fuel." In order to understand how this artificial low temperature heat reservoir is created, it is important to understand the underlying physics of evaporating water.

The temperature of a given quantity of water is determined by the average kinetic energy of all the water molecules in the water. There will always be some molecules that move faster than others. If they are near the surface (i.e., the boundary separating the air and water) and have sufficient velocity to overcome the surface tension of the water, they will leave the water and enter the air as gaseous vapor. Thus, if the surface area of the air/water boundary is large relative to the amount of water, a large fraction of molecules moving with high kinetic energy will escape the water and enter the air as vapor. If there is no heat added to the water during this process by some external source in thermal contact with the water, the effect of these high-energy molecules leaving the water will lower the average kinetic energy of all the remaining water molecules which results in a lowering of the temperature of the water. This process is known as "evaporation" and the resulting lowering of the water temperature is known as "evaporative cooling."

If the evaporating process is allowed to continue, the average kinetic energy of the remaining water molecules will become lower and lower. Thus, the water temperature will continue to fall. If the air containing the evaporated water vapor is continuously removed from the air/water boundary layer so that it never reaches the saturation point, the evaporation process will continue and the water temperature will continue to fall. Eventually, the average kinetic energy of the remaining water molecules become so low that all the water will eventually freeze at 32° F. But even in the solid state, there are some freely-moving molecules that still have sufficiently high velocity to escape from the frozen water. Thus, even the temperature of the frozen water will continue to decrease as long as there is an unlimited supply of unsaturated air blowing over the air/water boundary. Virtually all the kinetic energy of the high-energy water molecules that eventually escape from the water is obtained from intermolecular collisions with other water molecules. Since the density and thermal conductivity of the air blowing over the air/water boundary layer is so small compared to that of the body of water, very little of the high kinetic energy of the escaping water molecules will come from the kinetic energy of the air molecules. Additional details of the physics of evaporating water in air can be found in the book, *Drying and Processing of Materials by means of Conditioned Air*, Carrier Engineering Corporation, 1929, pages 26-42 by D. C. Lindsay.

In the field of "evaporative cooling" achieved by evaporating water, the temperature at which water evaporates in air is called the "wet bulb temperature." It depends upon the local air temperature (local ambient atmospheric temperature) called the "dry-bulb temperature," and the local relative humidity (also known as percent saturation). It can be determined from a chart called a "Psychrometric Chart." FIG. 1 is a typical Psychrometric Chart covering a dry-bulb temperature range of 20° F. (266° K) to 105° F. (314° K). As an illustrative example of how to use the Psychrometric Chart to determine the temperature of evaporating water when the ambient air temperature (dry-bulb temperature) is 80° F. and the relative humidity is 10%, follow the 80° F. vertical line upward until it intersects the 10% relative humidity curve and follow the diagonal wet-bulb temperature curve until it intersects the wet-bulb saturation curve indicated on the chart. The value of the wet-bulb temperature of evaporating water for these conditions is 52.18° F. (284.37° K).

Tables 1-6 give the values of the dry-bulb and wet-bulb temperatures corresponding to dry-bulb temperatures (ambient air temperatures) ranging from 50° F. (283.16° K) to 110° F. (316.48° K) and relative humidity ranging from 0% to 50%. The tables also gives the latent heat of evaporating water (sub-ambient heat sink) corresponding to the various wet-bulb temperatures.

TABLE 1

Measured Wet-Bulb Temperatures Corresponding to Various Dry-Bulb Temperatures of Evaporating Water (Relative Humidity = 0%) $T_H$ = Dry Bulb Temperature, $T_L$ = Wet Bulb Temperature, $\Delta T$ = Temperature Drop, $\hat{Q}_L$ = Specific Latent Heat of Evaporation of Water

| $T_H$ | $T_L$ | $\Delta T$ | $\hat{Q}_L$ (J/gm) |
|---|---|---|---|
| 50° F. (283.16° K) | 32.60° F. (273.49° K) | 17.40° F. (9.67° K) | 2500.11 |
| 55° F. (285.94° K) | 35.50° F. (275.10° K) | 19.50° F. (10.84° K) | 2496.32 |
| 60° F. (288.72° K) | 38.24° F. (276.63° K) | 21.76° F. (12.09° K) | 2492.68 |
| 65° F. (291.49° K) | 40.95° F. (278.13° K) | 24.05° F. (13.36° K) | 2489.06 |
| 70° F. (294.27° K) | 43.30° F. (279.44° K) | 26.70° F. (14.83° K) | 2485.96 |
| 75° F. (297.05° K) | 45.92° F. (280.89° K) | 29.08° F. (16.16° K) | 2482.57 |
| 80° F. (299.83° K) | 48.13° F. (282.12° K) | 31.87° F. (17.71° K) | 2479.60 |
| 85° F. (302.60° K) | 50.57° F. (283.48° K) | 34.43° F. (19.13° K) | 2476.39 |
| 90° F. (305.38° K) | 52.60° F. (284.60° K) | 37.40° F. (20.78° K) | 2473.80 |
| 95° F. (308.16° K) | 54.73° F. (285.79° K) | 40.27° F. (22.37° K) | 2470.91 |
| 100° F. (310.94° K) | 56.66° F. (286.86° K) | 43.34° F. (24.08° K) | 2468.42 |
| 105° F. (313.72° K) | 58.62° F. (287.95° K) | 46.38° F. (25.77° K) | 2465.86 |
| 110° F. (316.49° K) | 60.65° F. (289.08° K) | 49.35° F. (27.42° K) | 2463.12 |

TABLE 2

Measured Wet-Bulb Temperatures Corresponding to Various Dry-Bulb Temperatures of Evaporating Water (Relative Humidity = 10%)
$T_H$ = Dry Bulb Temperature, $T_L$ = Wet Bulb Temperature, $\Delta T$ = Temperature Drop, $\hat{Q}_L$ = Specific Latent Heat of Evaporation of Water

| $T_H$ | $T_L$ | $\Delta T$ | $\hat{Q}_L$ (J/gm) |
|---|---|---|---|
| 50° F. (283.16° K) | 34.40° F. (274.48° K) | 15.60° F. (8.67° K) | 2497.73 |
| 55° F. (285.94° K) | 37.60° F. (276.26° K) | 17.40° F. (9.67° K) | 2493.53 |
| 60° F. (288.72° K) | 39.40° F. (277.26° K) | 20.60° F. (11.44° K) | 2491.12 |
| 65° F. (291.49° K) | 43.38° F. (279.47° K) | 21.62° F. (12.01° K) | 2485.93 |
| 70° F. (294.27° K) | 46.35° F. (281.12° K) | 23.65° F. (13.14° K) | 2482.00 |
| 75° F. (297.05° K) | 49.51° F. (282.88° K) | 25.49° F. (14.16° K) | 2477.81 |
| 80° F. (299.83° K) | 52.18° F. (284.36° K) | 27.82° F. (15.46° K) | 2474.30 |
| 85° F. (302.60° K) | 55.02° F. (285.94° K) | 29.98° F. (16.66° K) | 2470.58 |
| 90° F. (305.38° K) | 57.96° F. (287.57° K) | 32.04° F. (17.80° K) | 2466.75 |
| 95° F. (308.16° K) | 60.73° F. (289.11° K) | 34.27° F. (19.04° K) | 2463.10 |
| 100° F. (310.94° K) | 63.45° F. (290.62° K) | 36.55° F. (20.31° K) | 2459.48 |
| 105° F. (313.72° K) | 66.00° F. (292.04° K) | 39.00° F. (21.67° K) | 2456.13 |
| 110° F. (316.49° K) | 68.50° F. (293.43° K) | 41.50° F. (23.06° K) | 2452.81 |

TABLE 3

Measured Wet-Bulb Temperatures Corresponding to Various Dry-Bulb Temperatures of Evaporating Water (Relative Humidity = 20%)
$T_H$ = Dry Bulb Temperature, $T_L$ = Wet Bulb Temperature, $\Delta T$ = Temperature Drop, $\hat{Q}_L$ = Specific Latent Heat of Evaporation of Water

| $T_H$ | $T_L$ | $\Delta T$ | $\hat{Q}_L$ (J/gm) |
|---|---|---|---|
| 50° F. (283.16° K) | 36.45° F. (275.62° K) | 13.55° F. (7.53° K) | 2495.72 |
| 55° F. (285.94° K) | 40.00° F. (277.59° K) | 15.00° F. (8.33° K) | 2491.04 |
| 60° F. (288.72° K) | 43.30° F. (279.43° K) | 16.70° F. (9.28° K) | 2486.73 |
| 65° F. (291.49° K) | 46.70° F. (281.33° K) | 18.30° F. (10.17° K) | 2482.21 |
| 70° F. (294.27° K) | 50.00° F. (283.15° K) | 20.00° F. (11.11° K) | 2477.98 |
| 75° F. (297.05° K) | 53.00° F. (284.82° K) | 22.00° F. (12.22° K) | 2473.27 |
| 80° F. (299.83° K) | 56.36° F. (286.68° K) | 23.64° F. (13.13° K) | 2468.88 |
| 85° F. (302.60° K) | 59.80° F. (288.59° K) | 25.20° F. (14.00° K) | 2464.28 |
| 90° F. (305.38° K) | 62.90° F. (290.32° K) | 27.10° F. (15.06° K) | 2460.23 |
| 95° F. (308.16° K) | 66.06° F. (292.07° K) | 28.94° F. (16.08° K) | 2456.11 |
| 100° F. (310.94° K) | 69.20° F. (293.82° K) | 30.80° F. (17.11° K) | 2451.98 |
| 105° F. (313.72° K) | 72.35° F. (295.57° K) | 32.65° F. (18.14° K) | 2447.76 |
| 110° F. (316.49° K) | 75.45° F. (297.29° K) | 34.55° F. (19.19° K) | 2443.67 |

TABLE 4

Measured Wet-Bulb Temperatures Corresponding to Various Dry-Bulb Temperatures of Evaporating Water (Relative Humidity = 30%)
$T_H$ = Dry Bulb Temperature, $T_L$ = Wet Bulb Temperature, $\Delta T$ = Temperature Drop, $\hat{Q}_L$ = Specific Latent Heat of Evaporation of Water

| $T_H$ | $T_L$ | $\Delta T$ | $\hat{Q}_L$ (J/gm) |
|---|---|---|---|
| 50° F. (283.16° K) | 38.30° F. (276.65° K) | 11.70° F. (6.50° K) | 2492.59 |
| 55° F. (285.94° K) | 42.00° F. (278.71° K) | 13.00° F. (7.22° K) | 2487.73 |
| 60° F. (288.72° K) | 45.30° F. (280.54° K) | 14.70° F. (8.17° K) | 2483.34 |
| 65° F. (291.49° K) | 49.55° F. (282.90° K) | 15.45° F. (8.58° K) | 2477.83 |
| 70° F. (294.27° K) | 52.95° F. (284.79° K) | 17.05° F. (9.47° K) | 2473.30 |
| 75° F. (297.05° K) | 56.61° F. (286.82° K) | 18.39° F. (10.22° K) | 2468.49 |
| 80° F. (299.83° K) | 60.62° F. (288.72° K) | 19.98° F. (11.10° K) | 2464.03 |
| 85° F. (302.60° K) | 63.70° F. (290.76° K) | 21.30° F. (11.88° K) | 2459.19 |
| 90° F. (305.38° K) | 67.20° F. (292.71° K) | 22.80° F. (12.67° K) | 2454.53 |
| 95° F. (308.16° K) | 70.75° F. (294.68° K) | 24.25° F. (13.47° K) | 2449.88 |
| 100° F. (310.94° K) | 74.40° F. (296.71° K) | 25.60° F. (14.22° K) | 2445.09 |
| 105° F. (313.72° K) | 77.95° F. (298.68° K) | 27.05° F. (15.03° K) | 2440.45 |
| 110° F. (316.49° K) | 80.42° F. (300.05° K) | 29.58° F. (16.43° K) | 2437.13 |

TABLE 5

Measured Wet-Bulb Temperatures Corresponding to Various Dry-Bulb Temperatures of Evaporating Water (Relative Humidity = 40%)
$T_H$ = Dry Bulb Temperature, $T_L$ = Wet Bulb Temperature, $\Delta T$ = Temperature Drop, $\hat{Q}_L$ = Specific Latent Heat of Evaporation of Water

| $T_H$ | $T_L$ | $\Delta T$ | $\hat{Q}_L$ (J/gm) |
|---|---|---|---|
| 50° F. (283.16° K) | 40.20° F. (277.71° K) | 9.80° F. (5.44° K) | 2490.13 |
| 55° F. (285.94° K) | 44.00° F. (279.82° K) | 11.00° F. (6.11° K) | 2485.06 |
| 60° F. (288.72° K) | 47.90° F. (281.98° K) | 12.10° F. (6.72° K) | 2480.69 |
| 65° F. (291.49° K) | 51.85° F. (284.18° K) | 13.15° F. (7.31° K) | 2475.43 |
| 70° F. (294.27° K) | 55.80° F. (286.37° K) | 14.20° F. (7.89° K) | 2469.58 |
| 75° F. (297.05° K) | 59.60° F. (288.48° K) | 15.40° F. (8.56° K) | 2464.56 |
| 80° F. (299.83° K) | 63.50° F. (290.65° K) | 16.50° F. (9.17° K) | 2459.45 |
| 85° F. (302.60° K) | 67.30° F. (292.71° K) | 17.70° F. (9.83° K) | 2454.53 |
| 90° F. (305.38° K) | 71.15° F. (294.90° K) | 18.85° F. (10.47° K) | 2449.36 |
| 95° F. (308.16° K) | 75.20° F. (297.15° K) | 19.80° F. (11.00° K) | 2444.05 |
| 100° F. (310.94° K) | 79.30° F. (299.43° K) | 20.70° F. (11.50° K) | 2438.62 |
| 105° F. (313.72° K) | 82.94° F. (301.45° K) | 22.06° F. (12.26° K) | 2433.87 |
| 110° F. (316.49° K) | 86.60° F. (303.48° K) | 23.40° F. (13.00° K) | 2428.99 |

TABLE 6

Measured Wet-Bulb Temperatures Corresponding to Various Dry-Bulb
Temperatures of Evaporating Water (Relative Humidity = 50%)
$T_H$ = Dry Bulb Temperature, $T_L$ = Wet Bulb Temperature, $\Delta T$ =
Temperature Drop, $\hat{Q}_L$ = Specific Latent Heat of Evaporation of Water

| $T_H$ | $T_L$ | $\Delta T$ | $\hat{Q}_L$ (J/gm) |
|---|---|---|---|
| 50° F. (283.16° K) | 41.96° F. (278.68° K) | 8.04° F. (4.47° K) | 2487.75 |
| 55° F. (285.94° K) | 45.98° F. (280.93° K) | 9.02° F. (5.01° K) | 2482.40 |
| 60° F. (288.72° K) | 50.20° F. (283.26° K) | 9.80° F. (5.44° K) | 2476.92 |
| 65° F. (291.49° K) | 54.30° F. (285.54° K) | 11.00° F. (6.11° K) | 2471.56 |
| 70° F. (294.27° K) | 58.40° F. (287.82° K) | 11.60° F. (6.44° K) | 2466.10 |
| 75° F. (297.05° K) | 62.70° F. (290.21° K) | 12.30° F. (6.83° K) | 2460.49 |
| 80° F. (299.83° K) | 66.70° F. (292.43° K) | 13.30° F. (7.39° K) | 2455.20 |
| 85° F. (302.60° K) | 70.80° F. (294.71° K) | 14.20° F. (7.89° K) | 2449.86 |
| 90° F. (305.38° K) | 74.83° F. (296.94° K) | 15.17° F. (8.43° K) | 2444.53 |
| 95° F. (308.16° K) | 78.90° F. (299.21° K) | 16.10° F. (8.94° K) | 2439.14 |
| 100° F. (310.94° K) | 83.00° F. (301.48° K) | 17.00° F. (9.44° K) | 2433.75 |
| 105° F. (313.72° K) | 87.20° F. (303.82° K) | 17.80° F. (9.89° K) | 2428.27 |
| 110° F. (316.49° K) | 91.40° F. (306.15° K) | 18.60° F. (10.33° K) | 2422.73 |

The above tables of measured wet-bulb temperatures corresponding to various dry-bulb temperatures (ambient air temperatures) and various humidity demonstrate the relatively large temperature drop that can be achieved by evaporating water. The large specific latent heat of evaporating water $\hat{Q}_L$ shows that the creation of a significant low temperature artificial heat sink capable of absorbing large amounts of the heat of compression generated by an isothermal compressor at sub-ambient temperature will be possible.

In order to determine the actual operating performance of the preferred embodiment of the invention, a detailed thermodynamic analysis will now be presented based on an assumed ambient air temperature, humidity, and corresponding temperature of evaporating water (which represents the artificially created low temperature heat reservoir), for the constant-phase working fluid of the closed cycle cryogenic engine which, because of its very high specific heat will be assumed to be compressed gaseous hydrogen. The corresponding sub-ambient temperature (i.e., the artificial sub-ambient heat sink of the isothermal compressor) generated by the evaporation of water at various humidities are determined from Tables 1-6. The detailed thermodynamic analysis of the closed-cycle cryogenic engine using compressed gaseous hydrogen working fluid presented herein will be based on the assumption that the relative humidity is 20% and the natural ambient air temperature (dry-bulb temperature) is 294° K (69.5° F.) which is the accepted average temperature of the natural atmosphere in the scientific literature. Therefore, assuming an ambient air temperature of 294° K and a relative humidity of 20%, it follows from Table 3 that the temperature of the evaporating water (i.e., the artificially created low temperature heat sink) in thermal contact with the external walls of the isothermal recompressor will be 283.15° K.

In 2007, the National Institute of Standards and Technology, (NIST) produced a publication entitled "NIST Reference Fluid Thermodynamic and Transport Properties-REFPROP Version 8.0." It was in the form of a computer code. By inputting the numerical values of any two of the four basic thermodynamic state parameters (Temperature T, Pressure P, Enthalpy H, Entropy S) of a gas, this computer code determines the accurate values of the two remaining parameters. The computer code also computes the density ρ corresponding to the four thermodynamic state parameters. Since the density of the compressed gaseous working fluid at various flow points in the closed cycle cryogenic engine will be an important design parameter in the invention, this parameter will also be determined along with the four basic thermodynamic state parameters at all of the engine's flow points. By using this computer code it will be possible to accurately determine the performance of the preferred embodiment of the closed cycle cryogenic engine disclosed in the present invention and thereby rigorously prove that the invention will generate an amount of propulsive power equal to, or exceeding that of internal combustion engines that propel conventional automobiles by burning fuel that is very costly and pollutes the environment.

The following quantitative thermodynamic performance analysis of the engine is based on normal operating conditions during average daytime hours when the engine is propelling a vehicle (assumed to be a passenger-carrying automobile) when the ambient air temperature is assumed to be 294° K (69.5° F.) and the humidity is 20%. Thus, Table 3 shows that the temperature of evaporating water at these conditions will be 283.15° K (50° F.) and the latent of evaporation $\hat{Q}_L$=2477.98 J/gm. It will also be assumed that the engine is operating in a steady-state condition where the mass flow rate of expanded gas $\dot{m}_E$ fed into the expansion system is equal to the mass flow rate $\dot{m}_C$ of gas being recompressed in the isothermal compressor (i.e., when the isothermal recompressor is turned on while the vehicle is being used for transportation which can be continued until the water in the vehicle's water tank is empty).

Figure 2:
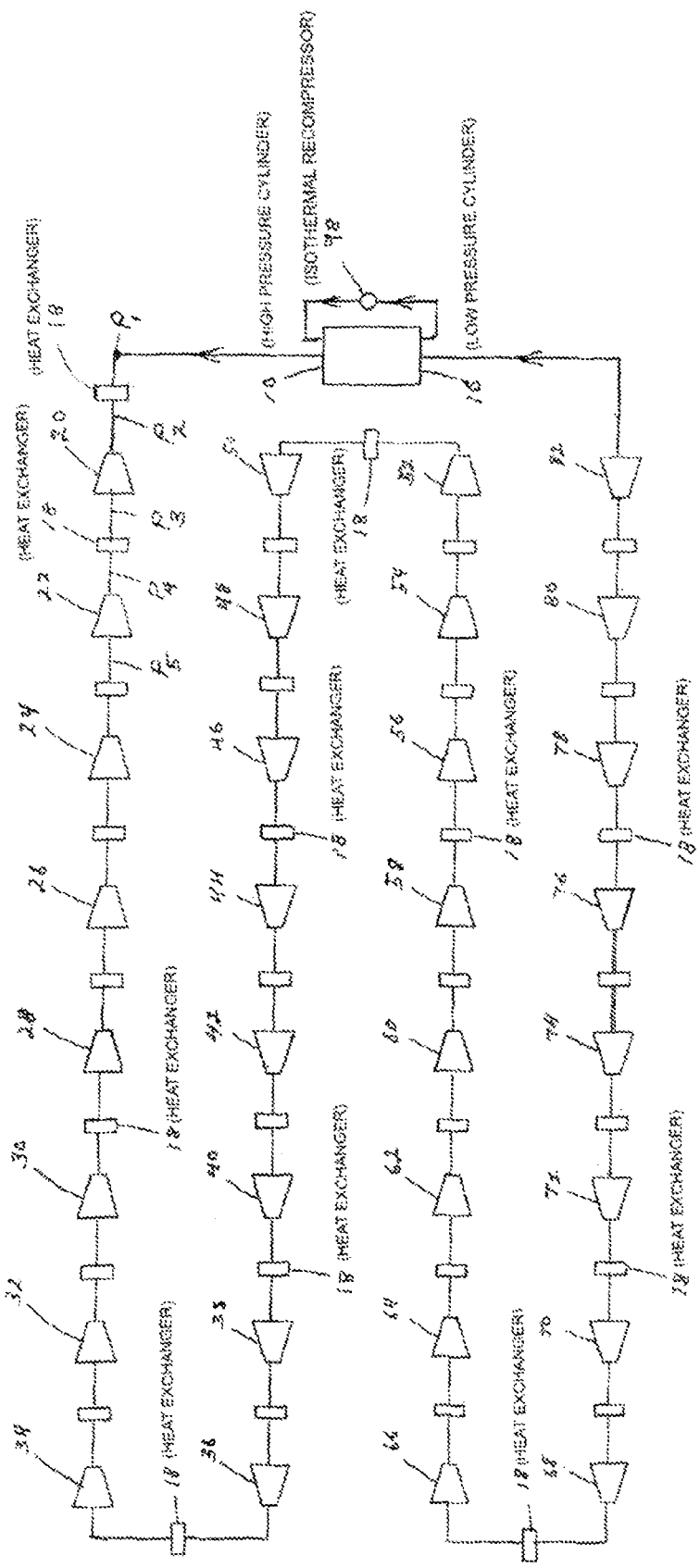
FIG. 2 is a schematic block diagram of the preferred embodiment of the closed cycle cryogenic engine illustrating its basic design and operating principles.
Figure 3:
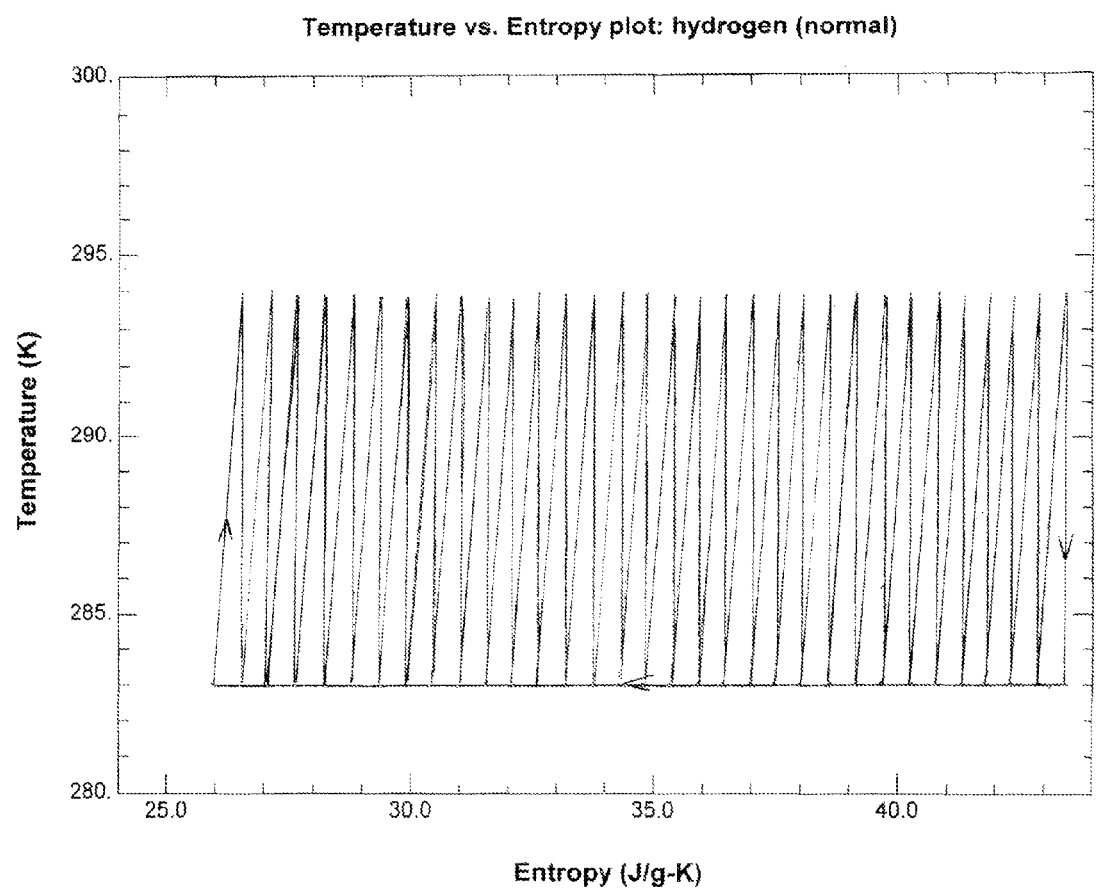
FIG. 3 is a Temperature-Entropy diagram (TS Diagram) of the constant-phase gaseous hydrogen working fluid illustrating the thermodynamic operating principles of the preferred embodiment of the invention.
Figure 4:
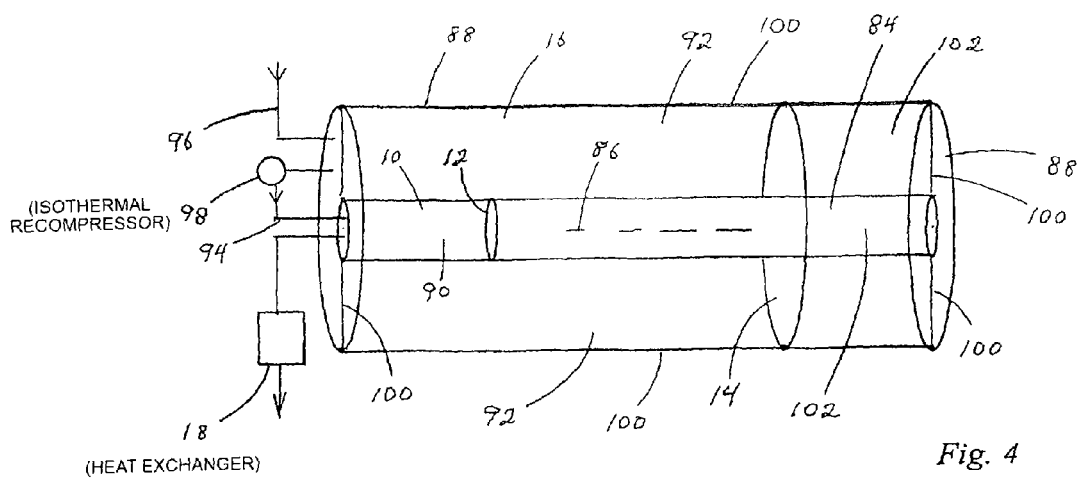
FIG. 4 is a longitudinal cross section through the high and low pressure, variable volume, compressed gas storage cylinders illustrating their design and operating principles.
Figure 5:
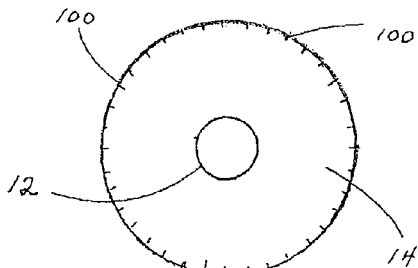
FIG. 5 is a transverse cross section through the variable-volume gas storage cylinders further illustrating their design and construction.

Referring to the schematic block diagram of the preferred embodiment of the invention shown in FIG. 2 corresponding to the above operating conditions, and to FIG. 3 which is the Temperature-Entropy Diagram of the preferred embodiment of the invention, compressed gaseous working fluid (assumed to be hydrogen gas) at a high initial pressure $P_H$=600 Bar and at the sub-ambient temperature of 283.15° K is withdrawn from the high pressure, variable-volume, thermally insulated, load-leveling gas storage cylinder 10 with a movable piston 12, as shown in FIGS. 4 and 5, that moves inward decreasing its volume, or outward increasing its volume, if the net mass flow rate entering or leaving this cylinder 10 is negative or positive, respectfully, and remains stationary if the amount of gas entering and leaving the high or low pressure cylinders remain constant. This important operating design feature of the invention shown in FIGS. 4 and 5 enables the gas pressure and temperature inside each cylinder to always remain constant regardless of the net mass flow rate of gas leaving or entering the cylinders 10, 16. Therefore, under the operating conditions assumed in this analysis, $\dot{m}_E=\dot{m}_C$. Hence, in this analysis of the engine, both pistons 12, 14 remain stationary in the high and low pressure cylinders 10, 16 when the engine is propelling the vehicle.

Referring to FIGS. 2 and 3, the cycle begins by withdrawing high-pressure gas from the high-pressure gas storage cylinder 10 at 600 Bar=$P_H$ and 283.15° K=$T_L$ at point $P_1$. The numerical values of all of the thermodynamic state parameters at point $P_1$, that are accurately determined by using the NIST computer code, are:

$T_1$=283.15° K, $P_1$=600.00 Bar, $S_1$=25.993 J/gm ° K, $H_1$=4081.8 J/gm, $\rho_1$=0.03658 gm/cm³

The compressed gas is then fed into the ambient heat exchanger 18 where it is isobarically heated to 294.00° K at point $P_2$ by extracting natural heat energy from the environment. The corresponding thermodynamic state parameters at point $P_2$, determined by the NIST computer code are:

$T_2$=294.00° K, $P_2$=600.00 Bar, $S_2$=26.557 J/gm ° K, $H_2$=4244.6 J/gm, $\rho_2$=0.03558 gm/cm³

The design and construction of high-pressure isothermal compressors is described on pages 161-183 in *Cryogenic Systems*, McGraw-Hill Book Company, New York, 1966, by R. Barron. The design and construction of high-pressure cryogenic heat exchangers that extract natural heat energy from flowing atmospheric air at ambient temperature is described on pages 129-161 of the same book.

After the heated compressed working fluid is withdrawn from the heat exchanger 18, at 294° K, it is fed into the first cryogenic expander 20 and isotopically expanded down to the temperature of evaporating water at 283.15° K at point $P_3$ in the Block Diagram shown in FIG. 2 thereby converting a portion of the natural heat energy absorbed in the exchanger 18 into mechanical work. The resulting thermodynamic state parameters at point $P_3$ determined by the computer code are:

$T_3$=283.15° K, $P_3$=525.22 Bar, $S_3$=26.557 J/gm ° K, $H_3$=4027.4 J/gm, $\rho_3$=0.03325 gm/cm³

This expanded low temperature gas at 283.15° K and pressure 525.22 Bar at point $P_3$ is then fed back into the heat exchanger 18 and isobarically reheated back to ambient temperature 294° K by extracting more natural heat energy from the environment. The resulting thermodynamic state parameters of the reheated gas at point $P_4$ are:

$T_4$=294.00° K, $P_4$=525.22 Bar, $S_4$=27.120 J/gm ° K, $H_4$=4189.9 J/gm, $\rho_4$=0.03231 gm/cm³

This reheated compressed gas is then fed into the second cryogenic expander 22 and isotopically expanded down to 283.15° K at point $P_5$ thereby converting additional natural heat energy absorbed in the exchanger 18 into additional mechanical work. The resulting thermodynamic state parameters of the gas leaving the second expander 22 at point $P_5$ determined by the computer code, are:

$T_5$=283.15° K, $P_5$=460.05 Bar, $S_5$=27.120 J/gm ° K, $H_5$=3981.1 J/gm, $\rho_5$=0.03014 gm/cm³

Since the initial high pressure of 600 Bar is so high, and the specific heat of hydrogen is very high, this process of isentropic expansion from the high temperature heat reservoir at 294° K down to the low temperature heat reservoir at 283.15° K thereby converting a large fraction of the natural heat energy extracted from the environment in the heat exchanger 18 and converted into mechanical work by each down stream expander can be repeated in many serially connected isentropic cryogenic expanders and isobaric reheating steps without recompressing the gas, the amount of mechanical work that can be generated by only 1 gm of compressed hydrogen gas at an initial pressure of 600 Bar is enormous.

Table 7 is a numerical tabulation of all the thermodynamic state parameters of 1 gm of compressed hydrogen working fluid passing through 32 cryogenic expanders and reheating steps corresponding to the preferred embodiment of the invention shown in the Block Diagram of FIG. 2. The corresponding Temperature-Entropy Diagram is shown in FIG. 3. The table also includes the numerical values of the specific mechanical work $\hat{W}_i$ generated by each of the 32 cryogenic expanders. Since each cryogenic expander is isentropic, the specific mechanical work $\hat{W}_i$ generated by each serially connected isentropic expander i is given by:

$$\hat{W}_i = H_{i-1} - H_i \quad (1)$$

The table also includes the density corresponding to the thermodynamic state parameters. From this table it is possible to determine the detailed quantitative performance of the preferred embodiment of the closed cycle cryogenic engine disclosed in the present invention.

TABLE 7

Quantitative Thermodynamic Analysis of the Preferred Embodiment of the Closed-Cycle Cryogenic Engine at Various Flow Points of the Engine's Hydrogen Working Fluid Shown in the Temperature -- Entropy and Temperature -- Pressure Diagrams and the Corresponding Numerical Values of the Work Generated by Each Serially-Connected Isentropic Expander:

| Flow Point | T (K) | P (Bar) | S (J/gm-°K) | H (J/gm) | ρ (gm/cm³) | $\hat{W}_i$ (J/gm) |
|---|---|---|---|---|---|---|
| 1 | 283.15 | 600.00 | 25.993 | 4081.8 | 0.036576 | — |
| 2 | 294.00 | 600.00 | 26.557 | 4244.6 | 0.035580 | — |
| 3 | 283.15 | 525.22 | 26.557 | 4027.4 | 0.033249 | 217.2 |
| 4 | 294.00 | 525.22 | 27.120 | 4189.9 | 0.032308 | — |
| 5 | 283.15 | 460.05 | 27.120 | 3981.1 | 0.030136 | 208.8 |
| 6 | 294.00 | 460.05 | 27.682 | 4143.2 | 0.029252 | — |
| 7 | 283.15 | 403.14 | 27.682 | 3941.8 | 0.027232 | 201.4 |
| 8 | 294.00 | 403.14 | 28.242 | 4103.5 | 0.026409 | — |
| 9 | 283.15 | 353.47 | 28.242 | 3908.4 | 0.024544 | 195.1 |
| 10 | 294.00 | 353.47 | 28.801 | 4069.7 | 0.023782 | — |
| 11 | 283.15 | 310.01 | 28.801 | 3880.1 | 0.022064 | 189.6 |
| 12 | 294.00 | 310.01 | 29.359 | 4041.0 | 0.021362 | — |
| 13 | 283.15 | 271.95 | 29.359 | 3856.1 | 0.019785 | 184.9 |
| 14 | 294.00 | 271.95 | 29.915 | 4016.6 | 0.019143 | — |
| 15 | 283.15 | 238.66 | 29.915 | 3835.8 | 0.017705 | 180.8 |
| 16 | 294.00 | 238.66 | 30.470 | 3995.9 | 0.017120 | — |
| 17 | 283.15 | 209.46 | 30.470 | 3818.6 | 0.015810 | 177.3 |
| 18 | 294.00 | 209.46 | 31.023 | 3978.3 | 0.015279 | — |
| 19 | 283.15 | 183.90 | 31.023 | 3804.1 | 0.014094 | 174.2 |
| 20 | 294.00 | 183.90 | 31.575 | 3963.3 | 0.013614 | — |
| 21 | 283.15 | 161.46 | 31.575 | 3791.7 | 0.012542 | 171.6 |
| 22 | 294.00 | 161.46 | 32.125 | 3950.6 | 0.012110 | — |
| 23 | 283.15 | 141.79 | 32.125 | 3781.3 | 0.011145 | 169.3 |
| 24 | 294.00 | 141.79 | 32.674 | 3939.8 | 0.010757 | — |
| 25 | 283.15 | 124.53 | 32.674 | 3772.4 | 0.009891 | 167.4 |
| 26 | 294.00 | 124.53 | 33.222 | 3930.5 | 0.009544 | — |
| 27 | 283.15 | 109.36 | 33.222 | 3764.8 | 0.008766 | 165.7 |
| 28 | 294.00 | 109.36 | 33.769 | 3922.6 | 0.008456 | — |
| 29 | 283.15 | 96.04 | 33.769 | 3758.4 | 0.007761 | 164.2 |
| 30 | 294.00 | 96.04 | 34.315 | 3915.9 | 0.007485 | — |
| 31 | 283.15 | 84.35 | 34.315 | 3752.8 | 0.006864 | 163.1 |
| 32 | 294.00 | 84.35 | 34.860 | 3910.1 | 0.006619 | — |
| 33 | 283.15 | 74.08 | 34.860 | 3748.1 | 0.006066 | 162.0 |
| 34 | 294.00 | 74.08 | 35.404 | 3905.1 | 0.005848 | — |
| 35 | 283.15 | 65.06 | 35.404 | 3744.0 | 0.005356 | 161.1 |
| 36 | 294.00 | 65.06 | 35.947 | 3900.8 | 0.005163 | — |
| 37 | 283.15 | 57.14 | 35.947 | 3740.5 | 0.004727 | 160.3 |
| 38 | 294.00 | 57.14 | 36.489 | 3897.1 | 0.004556 | — |
| 39 | 283.15 | 50.19 | 36.489 | 3737.5 | 0.004169 | 159.6 |
| 40 | 294.00 | 50.19 | 37.031 | 3893.8 | 0.004018 | — |
| 41 | 283.15 | 44.07 | 37.031 | 3734.9 | 0.003675 | 158.9 |
| 42 | 294.00 | 44.07 | 37.572 | 3891.1 | 0.003541 | — |
| 43 | 283.15 | 38.71 | 37.572 | 3732.6 | 0.003238 | 158.5 |
| 44 | 294.00 | 38.71 | 38.113 | 3888.6 | 0.003120 | — |
| 45 | 283.15 | 33.99 | 38.113 | 3730.7 | 0.002851 | 157.9 |
| 46 | 294.00 | 33.99 | 38.653 | 3886.5 | 0.002747 | — |
| 47 | 283.15 | 29.85 | 38.653 | 3729.0 | 0.002510 | 157.5 |
| 48 | 294.00 | 29.85 | 39.193 | 3884.7 | 0.002419 | — |
| 49 | 283.15 | 26.21 | 39.193 | 3727.5 | 0.002209 | 157.2 |
| 50 | 294.00 | 26.21 | 39.732 | 3883.1 | 0.002128 | — |
| 51 | 283.15 | 23.02 | 39.732 | 3726.2 | 0.001944 | 156.9 |
| 52 | 294.00 | 23.02 | 40.271 | 3881.7 | 0.001873 | — |
| 53 | 283.15 | 20.21 | 40.271 | 3725.1 | 0.001710 | 156.6 |
| 54 | 294.00 | 20.21 | 40.810 | 3880.5 | 0.001647 | — |
| 55 | 283.15 | 17.75 | 40.810 | 3724.1 | 0.001503 | 156.4 |
| 56 | 294.00 | 17.75 | 41.348 | 3879.4 | 0.001449 | — |
| 57 | 283.15 | 15.59 | 41.348 | 3723.2 | 0.001322 | 156.2 |
| 58 | 294.00 | 15.59 | 41.886 | 3878.5 | 0.001274 | — |
| 59 | 283.15 | 13.69 | 41.886 | 3722.5 | 0.001163 | 156.0 |
| 60 | 294.00 | 13.69 | 42.424 | 3877.7 | 0.001120 | — |
| 61 | 283.15 | 12.02 | 42.424 | 3721.8 | 0.001022 | 155.9 |
| 62 | 294.00 | 12.02 | 42.962 | 3877.0 | 0.000984 | — |

TABLE 7-continued

Quantitative Thermodynamic Analysis of the Preferred Embodiment of the Closed-Cycle Cryogenic Engine at Various Flow Points of the Engine's Hydrogen Working Fluid Shown in the Temperature -- Entropy and Temperature -- Pressure Diagrams and the Corresponding Numerical Values of the Work Generated by Each Serially-Connected Isentropic Expander:

| Flow Point | T (K) | P (Bar) | S (J/gm-°K) | H (J/gm) | ρ (gm/cm³) | $\hat{W}_i$ (J/gm) |
|---|---|---|---|---|---|---|
| 63 | 283.15 | 10.55 | 42.962 | 3721.2 | 0.000898 | 155.8 |
| 64 | 294.00 | 10.55 | 43.500 | 3876.4 | 0.000865 | — |
| 65 | 283.15 | 9.27 | 43.500 | 3720.7 | 0.000789 | 155.7 |
| 66 | 283.15 | 600.00 | 25.993 | 4081.8 | 0.036576 | — |

The total amount of specific mechanical work $\hat{W}_E$ generated by expanding 1.0 gm (unit mass) of the heated hydrogen working fluid at an initial pressure of 600 Bar through all of the 32 cryogenic expanders in each cycle through the engine is given by:

$$\hat{W}_E = \sum_{i=1}^{32} \hat{W}_i = 5413.1 \text{ J/gm} \quad (2)$$

The accurate thermodynamic equation giving the specific mechanical work $\hat{W}_C$ consumed by an isothermal compressor operating at a constant low temperature $T_L$ with corresponding thermodynamic state parameters equal to $T_L, P_L, S_L, H_L$ to a high pressure with thermodynamic state parameters equal to $T_H, P_H, S_H, H_H$ is given by:

$$\hat{W}_C = T_L(S_L - S_H) - (H_L - H_H) \quad (3)$$

(See page 166 in *Cryogenic Systems*, by R. Barron, McGraw-Hill Book Company, New York, 1966.)

Thus, in the preferred embodiment of the invention with the thermodynamic operating parameters given in Table 7, the specific mechanical work consumed by the isothermal compressor will be:

$$\hat{W}_C = 283.15(43.50 - 25.99) - (3720.7 - 4081.8) = 5318.21 \text{ J/gm} \quad (4)$$

Hence, the net specific mechanical output work $\hat{W}_N$ of the preferred embodiment of the closed cycle cryogenic engine operating in a steady state during an average daytime temperature of 294° K (69.5° F.) when the humidity is 20% is:

$$\hat{W}_N = \hat{W}_E - \hat{W}_C = 5413.1 - 5318.2 = 94.9 \text{ J/gm} \quad (5)$$

Consequently, the output power that the preferred embodiment of the closed cycle cryogenic engine will generate by operating the engine with a mass flow rate $\dot{m}_H$ (gm/sec) of hydrogen working fluid during an average daytime temperature is given by:

$$P_H = \hat{W}_N \dot{m}_H = 94.89 \dot{m}_H \text{ (Watts)} \quad (6)$$

In the isothermal compression of a gas, the amount of heat generated by the isothermal compressor that must be removed to keep the temperature constant during the compression process is equal to the amount of work consumed by the compressor. (See page 391 in, *Mechanics, Heat And Sound*, by Francis Sears, Addison-Wesley Press, Inc. Cambridge Mass., 1952.) Hence, the specific heat of compression $\hat{Q}_C$ generated by the isothermal compressor that must be absorbed at the sub-ambient temperature of 283.15° K is equal to:

$$\hat{Q}_C = \hat{W}_C = 5318.21 \text{ J/gm} \quad (7)$$

Since the heat of compression at the low temperature $T_L = 283.15°$ K is absorbed by evaporating water, which Table 3 shows has a latent heat of evaporation at these operating conditions given by:

$$\hat{Q}_L = 2477.98 \text{ J/gm}$$

the rate $\dot{m}_W$ at which water must be evaporated to absorb the heat of compression generated by recompressing 1.0 gm of expanded working fluid is given by:

$$\hat{m}_W = \frac{\hat{Q}_C}{\hat{Q}_L} = \frac{5318.21}{2477.98} = 2.146 \text{ gm/sec} \quad (8)$$

Consequently, the mass flow rate $\dot{m}_W$ of evaporating water relative to the mass flow rate $\dot{m}_H$ of hydrogen gas working fluid circulating through the engine in a closed cycle is given by $$\dot{m}_W = \hat{m}_W \dot{m}_H = 2.146 \dot{m}_H \quad (9)$$

Thus, the amount of output power $P_W$ that the engine generates by evaporating water at a mass flow rate $\dot{m}_W$ (gm/sec) is given by the equation $$P_W = \left(\frac{94.89}{2.146}\right) \dot{m}_W = 44.21 \dot{m}_W \text{ (Watts)} \quad (10)$$

Since water is the only fluid that is consumed by the engine, this equation represents the performance equation of the preferred embodiment of the closed cycle cryogenic engine operating in a steady state during daylight hours when the air temperature is 294° K and the relative humidity is 20%.

Table 8 describes the engine's steady-state output power corresponding to various mass flow rates of evaporating water $\dot{m}_W$ which represents the engines "fuel" that propels the vehicle.

TABLE 8

Performance of the Preferred Embodiment of the Closed Cycle Cryogenic Engine (Isothermal Recompressor On)

| $\dot{m}_w$ (gm/sec) | $\dot{m}_H$ (gm/sec) | P (KW) | P(HP) |
|---|---|---|---|
| 25 | 12 | 1.11 | 1.50 |
| 50 | 23 | 2.21 | 3.00 |
| 75 | 35 | 3.32 | 4.51 |
| 100 | 47 | 4.42 | 6.01 |
| 125 | 58 | 5.53 | 7.51 |
| 150 | 69 | 6.63 | 9.02 |
| 200 | 93 | 8.84 | 12.02 |
| 250 | 116 | 11.05 | 15.03 |
| 300 | 140 | 13.26 | 18.03 |

Table 9 gives a listing of the power consumed by rolling friction (tires) and aerodynamic drag at various speeds corresponding to a four passenger vehicle having a gross mass of 1,230 kg (2,712 lbs), an aerodynamic drag coefficient $C_d$=0.19, a rolling drag coefficient $C_f$=0.005, and a total frontal area of 2.50 m². The data was extrapolated from the published article "Propulsion Technology: An Overview," *Automotive Engineering*, Vol. 100, No. 7, July 1992, pp. 29-33.

TABLE 9

Level Road Power Requirements For Low Drag Vehicles

| Speed (mph) | Tires (KW) | Aero (KW) | Total (KW) |
|---|---|---|---|
| 22 | 0.603 | 0.279 | 0.882 |
| 25 | 0.670 | 0.382 | 1.052 |
| 34 | 0.921 | 0.993 | 1.914 |
| 50 | 1.349 | 2.943 | 4.292 |
| 60 | 1.617 | 5.384 | 7.001 |
| 67 | 1.808 | 7.524 | 9.332 |
| 81 | 2.176 | 13.122 | 15.298 |

Table 9 shows that the constant propulsive power required to propel a low drag vehicle at 60 mph is about 7 KW. Hence, the preferred embodiment of the closed cycle cryogenic engine described herein operating in a steady-state condition where the expanded hydrogen gas is isothermally recompressed at the same mass flow rate that the gas is expanded, the required mass flow rate of evaporating water would be 158 gm/sec. Assuming that the vehicle's water tank has a capacity of 600 liters (158 gal), the engine would be able to propel the vehicle at a speed of 60 mph a distance of 63 miles on a tank full of water. Although a full 600 liter water tank would weigh 600 kg, this weight would be less than the weight of batteries required for propelling electric vehicles. The range would be far greater, the time to refill the water tank would only be few minutes as apposed to several hours for recharging the batteries of electric vehicles, and the cost of water is zero. And the power generated by the closed-cycle cryogenic engine would be far greater than the electric motors of electric vehicles.

Since the most common use of a standard passenger-carrying automobile is for traveling to and from a place of employment, or to a local shopping center or market, the average total distance a vehicle is driven each day would rarely exceed 63 miles. Hence, in the preferred embodiment of the invention, the high and low pressure gas storage cylinders are designed with relatively large volumes so that when the engine is used for propelling the vehicle, the isothermal recompressor is turned off, and when the vehicle is parked and not being used for transportation such as during the late night and early morning hours, the engine is automatically turned on (by an engine control computer) but only used for running the isothermal recompressor to refill the high-pressure gas storage cylinder to maximum capacity. After it is full, the engine control computer automatically turns off the engine.

Table 10 gives the propulsive power of the engine for various mass flow rates $\dot{m}_H$ of the closed cycle hydrogen working fluid when the isothermal compressor is turned off.

TABLE 10

Performance of the Preferred Embodiment of the Closed Cycle Cryogenic Engine (Isothermal Recompressor off)

| $\dot{m}_w$ (gm/sec) | $\dot{m}_H$ (gm/sec) | P (KW) | P(HP) |
|---|---|---|---|
| 0 | 12 | 64.96 | 88.32 |
| 0 | 23 | 124.50 | 169.27 |
| 0 | 35 | 189.59 | 257.59 |
| 0 | 47 | 254.42 | 345.90 |
| 0 | 58 | 313.96 | 426.86 |
| 0 | 69 | 373.50 | 507.82 |
| 0 | 93 | 503.42 | 684.45 |
| 0 | 116 | 627.92 | 853.72 |
| 0 | 140 | 757.83 | 1,030.35 |

Table 11 gives the propulsive power of the preferred embodiment of the closed-cycle cryogenic engine as a function of the revolutions per minute RPM, denoted by ω, of the engine's drive shaft. For definiteness, it will be assumed that each expansion stroke of each piston in the 32 serially connected cryogenic expanders, expands 1 gm of working fluid thereby generating a total of 5,413.1 Joules of output work for each rotation of the drive shaft. Thus, when the engine is being used for propelling the vehicle with the isothermal recompressor turned off, and by denoting $\hat{\omega}_0 = 5413.1$ (J/rev)/60=90.218 (J/rev), the engine's propulsive power P can be expressed by the equation $$P = \hat{\omega}_0 \omega 90.218\omega \text{ (Watts)} \tag{11}$$

where ω is equal to the engine's revolutions per minute (RPM) of its drive shaft. The equation giving the amount of power generated without operating the recompressor as a function of the mass flow rate $\dot{m}_H$ ( sec) of gas circulating in the engine is:

$$P = \hat{W}_E \dot{m}_H = 5413 \dot{m}_H \text{ (Watts)} \tag{12}$$

Table 11 describes the engine's output power corresponding to various engine RPM ω describing the enormous propulsive power it generates when the recompressor is not operating. In this operating condition when the isothermal recompressor is not on, there is no evaporation of water. The engine will keep operating until the compressed gas in the high pressure storage cylinder is exhausted. In this condition, the engine will be capable of generating much more propulsive power than most conventional internal combustion automobile engines.

TABLE 11

Performance of the Preferred Embodiment of the Closed Cycle Cryogenic Engine (Isothermal Compressor Off)

| ω(RPM) | $\dot{m}_H$ (gm/sec) | P (KW) | P(HP) |
|---|---|---|---|
| 100 | 1.67 | 9.02 | 12.27 |
| 200 | 3.33 | 18.04 | 24.53 |
| 300 | 5.00 | 27.07 | 36.80 |
| 400 | 6.67 | 36.09 | 49.06 |
| 500 | 8.33 | 45.11 | 61.33 |
| 600 | 10.00 | 54.13 | 73.60 |
| 700 | 11.66 | 63.15 | 83.86 |
| 800 | 13.33 | 72.17 | 98.13 |
| 900 | 15.00 | 81.20 | 110.39 |
| 1000 | 16.66 | 90.22 | 122.66 |
| 1500 | 23.99 | 135.33 | 183.99 |
| 2000 | 33.33 | 180.43 | 245.53 |

This table shows that when the vehicle is being used for transportation with the recompressor turned off, the engine's propulsive power will exceed that of most conventional prior art automobile engines powered by burning gasoline which is very costly and pollutes the environment. The only fuel consumed by the closed-cycle cryogenic engine disclosed in the present invention is water which has zero cost and generates no pollution. (The basic construction of high-pressure cryogenic engines used for propelling road vehicles is described in the article, "Liquid Nitrogen as an Energy Source for an Automotive Vehicle," *Advances in Cryogenic Engineering*, Vol. 25, 1980, pp. 831-837 by M. V. Sussman.)

In order to enable the engine to propel a vehicle over relatively long distances without operating the recompressor, the preferred embodiment will be designed with very large high and low pressure gas storage cylinders. FIGS. 4 and 5 are schematic transverse and longitudinal cross sections of these gas storage cylinders illustrating their design and construction.

As described above, one of the important design features of the cryogenic engine presented herein that distinguishes it from the prior art which enables it to operate as a closed-cycle cryogenic engine instead of an open-cycle cryogenic engine as in the prior art, is by designing the engine to operate with a working fluid that remains in the gaseous phase and has a very high specific heat. However, in order to achieve this closed-cycle operating feature, the gas discharged from the last expander must be accumulated and recompressed in two different gas storage vessels. And these gas storage vessels must be designed to maintain a constant temperature and pressure regardless of the mass flow rates of working fluid leaving the high pressure vessel, and the mass flow rate of the gas entering the low pressure vessel. Since these two vessels are independent of each other, the solution is not immediately apparent.

One of the most important design features of the present invention is the solution of this problem. This solution, presented herein, is based on designing the high and low pressure gas storage vessels as cylinders with variable volumes controlled by movable pistons that are connected to each other such that as the gas is withdrawn from the low pressure cylinder, isothermally recompressed, and fed back into the high-pressure cylinder, the gas in both cylinders always remain at the same pressure and temperature by moving the pistons. The volume of the low-pressure cylinder is increased or decreased by its moving piston according to whether or not the mass flow rate $\dot{m}_E$ of gas leaving the high pressure cylinder that is expanded and fed into the low pressure cylinder is greater than, or less than, the mass flow rate $\dot{m}_C$ of gas leaving the low pressure cylinder that is recompressed and fed into the high pressure cylinder. The reverse is true for the volume of the high pressure cylinder. The solution is obtained by connecting the pistons of these cylinders by flexible belts such that when one piston in one cylinder moves increasing or decreasing its volume, the other piston in the other cylinder moves at the same rate and distance decreasing or increasing its volume, respectively. This can be achieved by designing the low pressure cylinder with an annular cross-section and mounting the high pressure cylinder inside it and connecting the pistons with movable belts.

Referring to FIGS. 4 and 5, the low pressure cylinder 16 has an annular transverse cross-section with an inner diameter slightly greater than the external diameter of the cylindrical high-pressure cylinder 10. The high-pressure cylinder 10 has the same length as the low-pressure cylinder 16 and mounted in the vacant cylindrical cavity 84 of the low-pressure cylinder 16 along the same longitudinal central axis 86. The external walls of the low pressure cylinder 16 are thermally insulated with a thick blanket of multi-layer cryogenic thermal insulation 88.

By designing the movable outer annular low pressure piston 14 with a much larger cross-sectional area $A_L$ than the cross-sectional area $A_H$ of the high pressure piston 12 such that the pressure forces on each piston are equal given by the equation $$A_L P_L = A_H P_H \tag{13}$$

where $P_L$ and $P_H$ are the pressures in the low and high pressure cylinders, respectively, the pressure and temperature of the gas 90 inside the high pressure cylinder 10 will remain unchanged while it is being withdrawn at the mass flow rate $\dot{m}_E$ and while recompressed gas 94 is being fed into it at the same time, or at a different time and at a different mass flow rate equal to $\dot{m}_C$. Likewise, the gas pressure and temperature of the gas 92 inside the low-pressure cylinder 16 will also remain unchanged, while the expanded gas 96 is being fed into it at the same mass flow rate $\dot{m}_E$ and while gas is being withdrawn from the low pressure cylinder 16 at a mass flow rate $\dot{m}_C$, fed into the isothermal recompressor 98 where it is recompressed, and fed back into the high pressure cylinder 10. Consequently, when the net mass flow rate of low pressure gas $\dot{m}_E - \dot{m}_C$ entering the annular low pressure cylinder, 16 (which is equal to the net mass flow of gas leaving the high-pressure cylinder 10), the pressure inside the annular low pressure cylinder 16 acting on its annular piston 14 increases (or decreases) a very small amount thereby moving it at a very low rate that enlarges the volume of the low pressure cylinder (or decreases its volume) such that its gas pressure and temperature remains constant, while simultaneously moving, via the connecting belts 100, the cylindrical piston 12 of the inner high pressure gas storage cylinder 10 inward (or outward) at the same rate decreasing (or increasing) its volume such that its high pressure and sub-ambient temperature remains the same while the high pressure gas 90 inside it is being withdraw (or increased) at the same net mass flow rate equal to $\dot{m}_E - \dot{m}_C$. The space 102 on the other side of both pistons 12, 16, are sealed in a vacuum.

Since this load-leveling gas storage system is operated without any changes in the thermodynamic state parameters of the high-pressure gas 90 in the high pressure cylinder 10, and in the low pressure gas 92 in the low pressure cylinder 16, the amount of mechanical work required to move the pistons 12, 14, is zero. Thus, the pistons 12, 14, are automatically moved by the net mass flow leaving the high pressure cylinder 10 which is equal to the net mass flow rate of the gas entering the low pressure cylinder 16. Thus, the pistons 12, 14, automatically move by themselves in a self-correcting rate. If the motion is too fast in the low pressure cylinder 16, an increase in pressure will build up in the high pressure cylinder 10 which will automatically slow it down, and conversely, if the motion is too slow, an increasing pressure in the low pressure cylinder 16 will automatically speed it up.

In the preferred embodiment, the outside diameter D and length L of the annular low-pressure cylinder 16 will be 150 cm and 250 cm, respectively. Referring to FIGS. 4 and 5, the total cross-sectional area A of the cylinders corresponding to these dimensions can be calculated by the following equations:

$$A_H + A_L = A = \pi 75^2 = 17{,}671 \text{ cm}^2$$

$$A_H P_H = 600 A_H = A_L P_L = 9.2663 A_L$$

Hence, the volumes $V_H$, $V_L$ of the of the high and low pressure cylinders will be:

$$V_H = 67{,}220 \text{ cm}^3 \quad V_L = 4.35 \times 10^6 \text{ cm}^3$$

Thus, the maximum amount of high-pressure gas $M_H$ that the high-pressure cylinder can hold is when the high-pressure cylinder is full to maximum capacity will be $$M_H = \rho_H V_H = 2460 \text{ gm}$$

According to Table 9, the power required for propelling a low-drag vehicle at 50 mph is 4.292 KW. In view of Eq (12) when the engine is operating without the recompressor operating the required mass flow rate that will generate this power will be 0.7929 gm/sec. Thus, the vehicle will be able travel a distance of 43 miles at 50 mph with a full cylinder of high pressure gas without operating the recompressor. Since this distance is much further than the distance traveled during an average day, the preferred embodiment of the engine will be based on operating the recompressor only when the vehicle is parked and not being used for transportation. However, since the engine is controlled by a programmable computer, the computer could be programmed to automatically start the recompressor any time the vehicle is parked or if its speed becomes lower than some pre-selected speed and automatically stops when the high pressure cylinder is full to maximum capacity.

Figure 6:
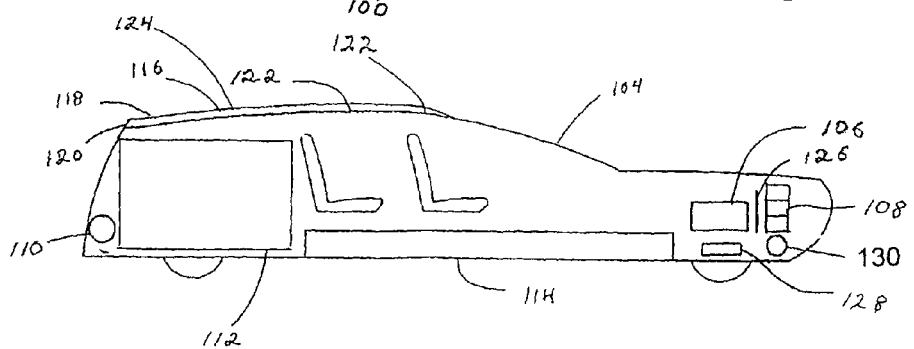
FIG. 6 is a schematic longitudinal cross section of an automobile propelled by the closed cycle cryogenic engine illustrating the positions of the various engine components mounted inside the vehicle.

FIG. 6 is a schematic longitudinal cross-section of a passenger-carrying road vehicle 104 propelled by the closed-cycle cryogenic engine disclosed herein showing the locations of the closed cycle cryogenic engine 106, ambient air heat exchanger 108, isothermal recompression system 110, variable-volume high and low pressure gas storage cylinders 112, and water tank 114. A secondary heat absorbing system 116 is mounted on the vehicle's roof. The external surface 118 of this secondary gas heating system 116 is fitted with a radiant heat absorbing material 120 that functions as a blackbody radiant heat absorber to absorb incident solar radiation during daylight hours. A system of heat absorbing copper tubes 122 are mounted under the heat absorbing black-body material 120 and in thermal contact with it. A heat absorbing fluid 124 is circulated through these tubes 122 and heated by absorbing the heat absorbed by the black-body material 120. (The detailed design and construction of passive solar heaters can be found in Ch. 3 "Solar Availability," pages 87-114, in *Applied Solar Energy—An Introduction*, Addison-Wesley Publishing Company, Reading Mass., 1978 by A. B. Meinel and M. P. Meinel.) After the tubes 122 leave the solar heater 116, they are thermally insulated and feed the heated fluid 124 into the ambient air heat exchanger 108. The heated fluid 124 is then transferred to secondary thermally insulated heating surfaces of the heat exchanger 108 that are in thermal contact with the compressed working fluid. After passing through the heat exchanger 108, the fluid 124 is fed back into the solar heater 116 where it is reheated and fed back into the ambient air heat exchanger 108 in a closed cycle. By varying the mass flow rate of the heating fluid 124, the temperature of the recompressed working fluid passing through the heat exchanger 108 can be controlled even when the vehicle is not moving and no atmospheric air is passing through the ambient air heat exchanger 108. Thus, the purpose of the secondary solar heating system 116 is to provide a passive heating source for heating the compressed working fluid when the vehicle is not moving, or when the ambient air temperature is very cold. By controlling the mass flow rate of the solar heating fluid 124, it is possible to control the temperature of the recompressed working fluid to achieve optimum engine performance under varying atmospheric temperatures and humidities, and when the vehicle is not moving and no air is circulating around the heat exchanger 108 to heat the compressed working fluid. This problem of no air circulation through the heat exchanger 108 when the vehicle is not moving can be partially solved by mounting a large rotating fan 126 behind the heat exchanger 108 similar to the rotating fans mounted behind the radiators of conventional automobile engines. As described above, the engine 106, and all of its various sub-systems 128 are controlled by a programmable computer 130.

Figure 7:
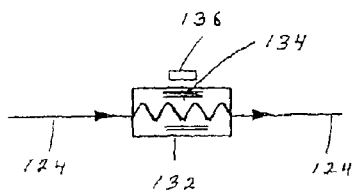
FIG. 7 is a schematic transverse cross section of a thermally insulated secondary heating system for heating the working fluid during rainy or very cold days.

In another variation of the invention, the above described secondary solar heating system can be replaced with a much smaller auxiliary heating system powered by a different heating source such as electrical heating filaments or the burning of small amounts of a combustible fuel such as Butane or Propane. Referring to FIG. 7 in this embodiment, the heat transfer fluid 124 is heated by circulating through a small thermally insulated heat exchanger 132 in thermal contact with heat transfer surfaces 134 heated by the auxiliary heating source 136. (The detailed design and construction of such systems are described in the book, *Heat Transfer*, McGraw-Hill Book Co., New York, 1983, by J. P. Holman.)

Since it is commonly believed that it is thermodynamically impossible to design a closed-cycle heat engine that generates any significant amount of net output work if the temperature difference $\Delta T = T_H - T_L$ between a high temperature heat reservoir at temperature $T_H$, and a low temperature heat reservoir at temperature $T_L$ it is very small, and since this difference is only 11 degrees in the present invention but still capable of generating high power densities, it is important to explain and emphasize the basic thermodynamic reasons that make the present invention possible. Therefore, assuming that the temperature $T_H$ of the high temperature heat reservoir in the present invention is only 294° K, and the temperature $T_L$ of the low temperature heat reservoir is 283° K giving a difference of only 11° K between the high and low temperature heat reservoirs, the corresponding Carnot efficiency $\eta$ is very low and given by $$\eta = \frac{T_H - T_L}{T_H} = \frac{294 - 283}{294} = 0.037 \ (3.7\%)$$

In order to better understand the thermodynamical reasons why it is possible to construct a closed cycle heat engine as disclosed in the present invention that will be able to generate so much power when operating in such a narrow high and low temperature range some additional basic equations of thermodynamics should be presented.

According to the basic laws of thermodynamics, if a compressed gas at an initial high pressure $P_H$ and temperature $T_H$ is isentropically expanded to a lower pressure $P_L$ and lower temperature $T_L$ with a pressure ratio r given by $$r = \frac{P_H}{P_L} \tag{14}$$

this pressure ratio is related to the temperatures $T_H$ and $T_L$ by the equation $$r = \frac{P_H}{P_L} = \left(\frac{T_L}{T_H}\right)^{\frac{\gamma}{1-\gamma}} \tag{15}$$

where γ is a constant that depends upon the particular gas. But this equation (as in the Carnot equation) is based on the assumption that the isentropic expansion takes place in one step. In the invention presented herein the pressure ratio of the preferred embodiment is given by $$r = \frac{P_H}{P_L} = \frac{600}{9.27} = 64.724 \tag{16}$$

With this very high pressure ratio, (way beyond anything in the prior art) the isentropic expansion system can be designed as a serially-connected multistage expansion system with many individual expansion and re-heating steps to extract a large amount of natural thermal energy from the atmosphere and convert a large fraction of it into mechanical work with one gm of working fluid that would otherwise be impossible in such a narrow high and low temperature range. The key that will enable this closed-cycle multistage cryogenic engine to be realizable with high net output work operating within a very narrow high and low temperature range is: (1) designing the recompression step to be isothermal instead of isentropic; (2) by absorbing the heat of compression by evaporating water, (3) the fact that water has a very high latent heat of evaporation, (4) using an unusual cryogenic working fluid, hydrogen, that has a very high specific heat that remains in the gaseous phase through the engine's closed operating cycle, (5) designing the engine's operating initial pressure very high so that by designing the expansion system as a serially connected plurality of isentropic cryogenic expanders having very low pressure ratios, many expansion and reheating steps are possible before recompression; and (6) accumulating the expanded working fluid in a thermally insulated, variable-volume, low pressure cylinder, so that, unlike all prior art cryogenic engines, it can be isothermally recompressed and fed back into the engine using an amount of mechanical work less that the amount of mechanical work generated by all the expanders in a closed cycle.

Let N denote the total number of serially connected isentropic expanders in a multistage expansion system having the same expansion ratio $r_0$. Consequently, it follows that the total expansion ratio r is $$r = \frac{P_H}{P_L} = (P_1/P_2)(P_2/P_3)(P_3/P_4) \ldots (P_N/P_{N+1}) = r_0^N \quad (17)$$

Hence, the pressure ratio $r_0$ of each individual expander is given by the equation $$r_0 = r^{1/N} \quad (18)$$

In the preferred embodiment of the invention, the number of serially connected isentropic expanders (stages) N is 32. Therefore, the pressure ratio $r_0$ of each expander will be $$r_0 = r^{1/32} = 64.72^{1/32} 1.139 \quad (19)$$

This very small expansion ratio will enable each expander in the 32 serially connected expansion system to operate between the very narrow high and low temperature range of $T_H=294°$ K (ambient temperature of the natural environment) and $T_L=28.3°$ K (equal to the temperature of evaporating water). This temperature difference $\Delta T$ is only 11° K However, after each expansion step, the working fluid still has a high pressure and is at the sub-ambient temperature $T_L$. Consequently it does not have to be recompressed. Instead, it is fed back into the infinite high temperature heat reservoir (the heat exchanger) and reheated back to ambient temperature by extracting more natural heat energy from the environment. After it is reheated, it is fed into the next down-stream expander generating more mechanical work in an expansion and reheating process that is repeated a total of 32 times without recompression. Consequently, the effect of this multistage expansion and reheating process is thermodynamically equivalent to one single expansion step with a high and low temperature difference of $$\Delta T=11\times32=352° \text{ K}=634° \text{ F.} \quad (20)$$

This temperature difference far exceeds that used in most conventional prior art steam generating plants for generating bulk electric power. This is the reason why the present closed-cycle cryogenic engine can generate so much power at such a low temperature without burning any combustible fuel. The basic thermodynamic operating principles of the invention are shown in the Temperature-Entropy Diagram of FIG. 3 which was constructed from the thermodynamic data of the engine's hydrogen working fluid generated by the NIST computer program shown in Table 7. This is the thermodynamic explanation for the operability of the present invention.

The above preferred embodiment of the closed-cycle cryogenic engine was primarily designed for propelling road vehicles. However, the engine could also be used for propelling other vehicles such as railroad locomotives, boats, and large ocean liners. Another useful application would be for generating unlimited amounts of clean, non-polluting electricity for private homes, factories, or for generating bulk electric power in large power plants for commerce and industry.

As various other embodiments, changes, and modifications, can be made in the above method and apparatus for generating mechanical power at high power densities by harnessing the natural thermal potential difference between the natural environment at ambient temperature and an artificial low temperature heat sink generated by evaporating water without departing from the spirit or scope of the invention, it is intended that all subject matter contained in the above description or shown in the accompanying drawings should be interpreted as illustrative and not in a limiting sense.

What is claimed is:

1. A method for operating a cryogenic engine having a high temperature heat reservoir represented by a natural heat energy in a surrounding environment at an ambient temperature and an artificial low temperature heat sink of at least two degrees Kelvin below the temperature of the surrounding environment in a closed cycle comprising the steps of:
creating the artificial low temperature heat sink by evaporating a supply of water;
isothermally compressing a gaseous working fluid at said low temperature from an initial low pressure to a high pressure by absorbing the heat of compression by evaporating water,
heating said compressed low temperature gaseous working fluid by absorbing said natural heat energy in the surrounding environment at a higher temperature;
expanding said heated compressed working fluid in an expander thereby converting a portion of said absorbed natural heat energy into mechanical work and producing an expanded low pressure working fluid:
repeating said heating and expansion steps with a plurality of at least three heating and expansion steps in series, wherein the working fluid discharged from one expander in the series is fed into a heat exchanger, heated, and fed into a next expander in the series thereby extracting and converting most of the absorbed natural heat energy from the environment and converting most of the absorbed natural heat energy into mechanical work; and repeating said heating and expansion steps in a closed cycle wherein said working fluid remains in the gaseous state; and
storing said compressed low temperature gaseous working fluid in a thermally insulated high pressure storage vessel and accumulating the expanded low pressure working fluid in a separate thermally insulated low pressure storage vessel, wherein said working fluid is withdrawn from said high pressure storage vessel and accumulated in said low pressure storage vessel;
wherein said storage vessels have variable volumes, and the volumes of said storage vessels are changed by movable pistons that are connected to each other such that as one piston moves increasing the volume of one of the high pressure storage vessel and the low pressure storage vessel, the other piston moves decreasing the volume of the other of the high pressure storage vessel and the low pressure storage vessel such that the temperature and pressure in each storage vessel remains unchanged.

2. The method as set forth in Claim 1 wherein said working fluid is gaseous hydrogen that remains in the gaseous state throughout said cycle.

3. The method as set forth in Claim 1 wherein said isothermal compression step compresses said working fluid to a pressure exceeding ten Bar.

4. The method as set forth in Claim 1 wherein the working fluid discharged from one expander in the series is fed into a beat exchanger, heated by extracting additional natural heat energy from the surrounding environment, and fed into the next expander in said series wherein the number of discharging, heating, and feeding into the next expander steps exceeds three.

5. The method as set forth in claim 1 further comprising the step of refilling said high pressure storage vessel by generating more mechanical power by said expansion step than is consumed by said isothermal compression step.

6. The method as set forth in claim 1 wherein said high and low pressure storage vessels have volumes large enough to enable the engine to operate for periods of time exceeding five minutes without having to isothermally compress said working fluid thereby enabling said cryogenic engine to operate daring these time intervals at higher power densities.

7. The method as set forth in Claim 1 further comprising the step of heating said working fluid above the temperature of the surrounding environment by absorbing solar radiant energy.

8. The method as set forth in Claim 1 further comprising the step of heating said working fluid above the temperature of the surrounding atmosphere by an additional heat generating source.

9. The method as set forth in Claim 1 wherein said method for operating a cryogenic engine in a closed cycle for generating mechanical work is used for propelling vehicles or generating electricity by the additional step of adding a mechanical linkage system to said cryogenic engine whereby the output power generated by said cryogenic engine as set forth in claim 1 drives a system that propels said vehicles or drives an electric generator that generates said electricity.

* * * * *